US009198101B2

(12) United States Patent
Lee et al.

(10) Patent No.: US 9,198,101 B2
(45) Date of Patent: Nov. 24, 2015

(54) METHOD FOR TRANSMITTING CONTROL INFORMATION IN WIRELESS COMMUNICATION SYSTEM AND DEVICE THEREFOR

(75) Inventors: Seungmin Lee, Anyang-si (KR); Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 48 days.

(21) Appl. No.: 14/005,959

(22) PCT Filed: Apr. 19, 2012

(86) PCT No.: PCT/KR2012/003005
§ 371 (c)(1),
(2), (4) Date: Sep. 18, 2013

(87) PCT Pub. No.: WO2012/144823
PCT Pub. Date: Oct. 26, 2012

(65) Prior Publication Data
US 2014/0029573 A1    Jan. 30, 2014

Related U.S. Application Data

(60) Provisional application No. 61/477,166, filed on Apr. 19, 2011.

(51) Int. Cl.
*H04W 36/06*    (2009.01)
*H04W 36/08*    (2009.01)
*H04W 72/12*    (2009.01)

(52) U.S. Cl.
CPC .......... *H04W 36/08* (2013.01); *H04W 72/1289* (2013.01)

(58) Field of Classification Search
CPC .............................. H04W 80/04; H04W 36/18

USPC .......................................................... 370/331
See application file for complete search history.

(56) References Cited

U.S. PATENT DOCUMENTS

2009/0073955 A1* 3/2009 Malladi .......................... 370/349
2009/0285116 A1* 11/2009 Nanda et al. ................... 370/252
(Continued)

FOREIGN PATENT DOCUMENTS

WO    WO 2011/005032 A2    1/2011
WO    WO 2011/021830 A2    2/2011
(Continued)

OTHER PUBLICATIONS

LG Electronics, "Resource Allocation for ACK/NACK Channel Selection in FDD," 3GPP TSG RAN WG1 #63bis, Agenda Item 6.2.1, R1-110367, Jan. 17-21, 2011, Dublin, Ireland, 5 pages.

*Primary Examiner* — Mark Rinehart
*Assistant Examiner* — Peter Solinsky
(74) *Attorney, Agent, or Firm* — Birch, Stewart, Kolasch & Birch, LLP

(57) ABSTRACT

The present invention relates to a wireless communication system, more specifically to a method for transmitting control information and a device therefor. The wireless communication system can support carrier aggregation. The present invention relates to a method for transmitting information from a terminal to a base station in a wireless communication system, which includes a step for receiving first information for cross carrier scheduling through at least one primary cell among serving cells formed in a terminal from the base station, and a step for transmitting second information about a secondary cell related to at least one first information among serving cells to the base station through an uplink resource of the primary cell.

22 Claims, 31 Drawing Sheets

(56) References Cited

U.S. PATENT DOCUMENTS

| | | | |
|---|---|---|---|
| 2011/0134774 A1* | 6/2011 | Pelletier et al. | 370/252 |
| 2011/0134902 A1* | 6/2011 | Ko et al. | 370/344 |
| 2011/0243066 A1* | 10/2011 | Nazar et al. | 370/328 |
| 2011/0243106 A1* | 10/2011 | Hsu et al. | 370/336 |
| 2011/0274043 A1* | 11/2011 | Nam et al. | 370/328 |
| 2011/0310986 A1* | 12/2011 | Heo et al. | 375/259 |
| 2012/0082082 A1* | 4/2012 | Etemad et al. | 370/312 |
| 2012/0083284 A1* | 4/2012 | Harrison et al. | 455/450 |
| 2012/0087254 A1* | 4/2012 | Yin et al. | 370/252 |
| 2012/0106407 A1* | 5/2012 | Papasakellariou et al. | 370/280 |
| 2012/0113941 A1 | 5/2012 | Chung et al. | |
| 2012/0127950 A1 | 5/2012 | Chung et al. | |
| 2012/0243497 A1* | 9/2012 | Chung et al. | 370/329 |
| 2012/0250520 A1* | 10/2012 | Chen et al. | 370/241 |
| 2013/0039321 A1* | 2/2013 | Kim et al. | 370/329 |
| 2013/0188592 A1* | 7/2013 | Yang et al. | 370/329 |
| 2013/0229998 A1* | 9/2013 | Noh et al. | 370/329 |
| 2013/0250822 A1* | 9/2013 | Yang et al. | 370/280 |
| 2014/0003303 A1* | 1/2014 | Yang et al. | 370/280 |
| 2014/0078941 A1* | 3/2014 | Seo et al. | 370/280 |
| 2014/0086167 A1* | 3/2014 | Seo et al. | 370/329 |
| 2014/0321337 A1* | 10/2014 | Kim et al. | 370/280 |
| 2014/0341065 A1* | 11/2014 | Liao et al. | 370/252 |
| 2014/0369322 A1* | 12/2014 | Fwu et al. | 370/336 |

FOREIGN PATENT DOCUMENTS

| | | |
|---|---|---|
| WO | WO 2011/040788 A2 | 4/2011 |
| WO | WO 2011/041623 A1 | 4/2011 |

* cited by examiner

FIG. 5
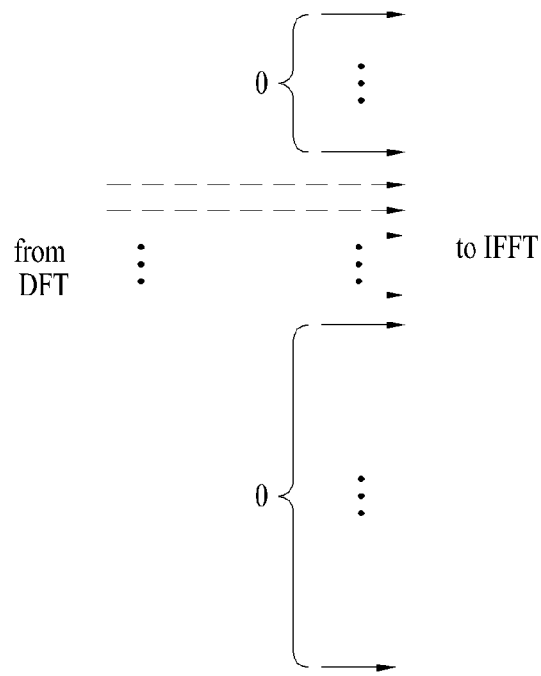
(a)
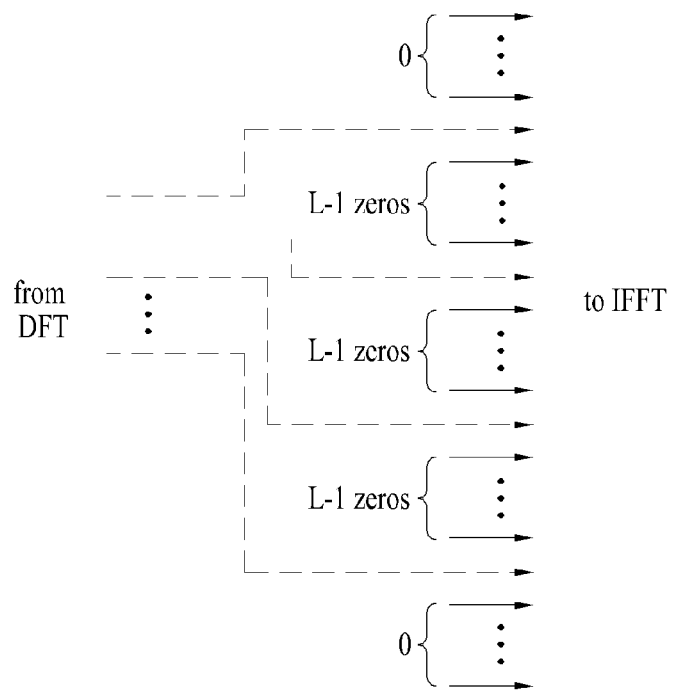
(b)

PUCCH format 1a and 1b structure (normal CP case)

PUCCH format 1a and 1b structure (extended CP case)

PUCCH format 2, 2a and 2b structure (normal CP case)

PUCCH format 2, 2a and 2b structure (extended CP case)

FIG. 17

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n' = 0 | | | n' = 0 | | |
| 2 | 1 | | 6 | 12 | | 6 | 12 |
| 3 | 2 | 1 | 7 | 13 | 1 | 7 | 13 |
| 4 | 3 | | | | | | |
| 5 | 4 | 2 | 8 | 14 | 2 | 8 | 14 |
| 6 | 5 | | | | | | |
| 7 | 6 | 3 | 9 | 15 | 3 | 9 | 15 |
| 8 | 7 | | | | | | |
| 9 | 8 | 4 | 10 | 16 | 4 | 10 | 16 |
| 10 | 9 | | | | | | |
| 11 | 10 | 5 | 11 | 17 | 5 | 11 | 17 |
| 0 | 11 | | | | | | |

$\delta_{offset}^{PUCCH} \in \{0, 1, ..., \Delta_{shift}^{PUCCH} - 1\}$ Cell specific cyclic shift offset Cell-specific Cyclic shift value of CAZAC sequence $\Delta_{shift}^{PUCCH} \in \{\{1,2,3\}$ for normal cyclic prefix
$\{1,2,3\}$ for extended cyclic prefix $n_{OC}$    Orthogonal sequence index for ACK/NACK
$\bar{n}_{OC}$    Orthogonal sequence index for RS
$n_{CS}$    Cyclic shift value of a CAZAC sequence
n'    ACK/NACK resource index used for the channelization in a RB

METHOD FOR TRANSMITTING CONTROL INFORMATION IN WIRELESS COMMUNICATION SYSTEM AND DEVICE THEREFOR

CROSS REFERENCE TO RELATED APPLICATIONS

This non-provisional application is a National Stage entry under U.S.C. §371 of International Application No. PCT/KR2012/003005 filed on Apr. 19, 2012, which claims the benefit of U.S. Provisional Application No. 61/477,166 filed on Apr. 19, 2011. The entire contents of all of the above applications are hereby incorporated by reference.

TECHNICAL FIELD

The present invention relates to a wireless communication system, and more particularly, to a method and apparatus for transmitting control information. The wireless communication system may support Carrier Aggregation (CA).

BACKGROUND ART

Wireless communication systems have been widely deployed in order to provide various types of communication services including voice or data. In general, a wireless communication system is a multiple access system that can support communication with multiple users by sharing available system resources (a bandwidth, transmission power, etc.) among the multiple users. Examples of the multiple access system include Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

DISCLOSURE

Technical Problem

An object of the present invention devised to solve the conventional problem is to provide a method and apparatus for efficiently transmitting control information in a wireless communication system. Another object of the present invention is to provide a channel format, signal processing method, and apparatus for efficiently transmitting control information. Another object of the present invention is to provide a method and apparatus for efficiently allocating resources to transmit control information.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting information to a Base Station (BS) at a User Equipment (UE) in a wireless communication system includes receiving first information for cross carrier scheduling from the BS in a primary cell among at least one serving cell configured for the UE, and transmitting second information about a secondary cell related to the first information among the at least one serving cell to the BS in an uplink resource of the primary cell.

Preferably, the second information may include at least one of information indicating whether a Physical Uplink Shared CHannel (PUSCH) is transmitted in the secondary cell, information about a starting time of the PUSCH transmission, and information about an ending time of the PUSCH transmission.

Preferably, the uplink resource of the primary cell may include a Physical Uplink Control CHannel (PUCCH) and a PUSCH.

Preferably, the second information may be one bit. If the second information indicates 0, the second information may indicate no Physical Uplink Shared CHannel (PUSCH) transmission in the secondary cell and if the second information indicates 1, the second information may indicate that the PUSCH is transmitted in the secondary cell, starting from the starting time of a corresponding slot.

Preferably, the second information may be two bits and the second information may indicate whether a Physical Uplink Shared CHannel (PUSCH) is transmitted in the secondary cell, a starting time of the PUSCH transmission, and an ending time of the PUSCH transmission according to a combination of the two bits.

Preferably, the ending time of the PUSCH transmission may be when a predetermined period for the PUSCH transmission ends after the starting time of the PUSCH transmission.

Preferably, the ending time of the PUSCH transmission may be a subframe boundary or a slot boundary of the primary cell, closest to the starting time of the PUSCH transmission.

Preferably, the method may further include transmitting state information about the secondary cell to the BS, and the state information may include the second information.

Preferably, the state information may indicate that a result of carrier sensing of the secondary cell is kept busy for a predetermined time or longer.

In another aspect of the present invention, a UE for transmitting information to a BS in a wireless communication system includes a processor, a reception module configured to receive first information for cross carrier scheduling from the BS in a primary cell among at least one serving cell configured for the UE, and a transmission module configured to transmit second information about a secondary cell related to the first information among the at least one serving cell to the BS in an uplink resource of the primary cell.

Preferably, the second information may include at least one of information indicating whether a Physical Uplink Shared CHannel (PUSCH) is transmitted in the secondary cell, information about a starting time of the PUSCH transmission, and information about an ending time of the PUSCH transmission.

Preferably, the uplink resource of the primary cell may include a Physical Uplink Control CHannel (PUCCH) and a Physical Uplink Shared CHannel (PUSCH).

Preferably, the second information may be one bit. If the second information indicates 0, the second information may indicate no PUSCH transmission in the secondary cell and if the second information indicates 1, the second information may indicate the PUSCH is transmitted in the secondary cell, starting from the starting time of a corresponding slot.

Preferably, the second information may be two bits, and the second information may indicate whether a Physical Uplink Shared CHannel (PUSCH) is to be transmitted in the secondary cell, a starting time of the PUSCH transmission, and an ending time of the PUSCH transmission according to a combination of the two bits.

Preferably, the ending time of the PUSCH transmission may be when a predetermined period for the PUSCH transmission ends after the starting time of the PUSCH transmission.

Preferably, the ending time of the PUSCH transmission may be a subframe boundary or a slot boundary of the primary cell, closest to the starting time of the PUSCH transmission.

Preferably, the processor may control transmission of state information about the secondary cell to the BS through the transmission module, and the state information may include the second information.

Preferably, the state information may indicate that a result of carrier sensing of the secondary cell is kept busy for a predetermined time or longer.

Advantageous Effects

According to the present invention, control information can be transmitted efficiently in a wireless communication system. A channel format and a signal processing method for efficiently transmitting control information can be provided. Furthermore, resources in which control information is transmitted can be efficiently allocated.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 illustrates examples of mapping input symbols to subcarriers in a frequency domain in a manner that satisfies a single carrier property;

FIG. 17 illustrates ACK/NACK channelization for PUCCH format 1a and PUCCH format 1b;

BEST MODE

Figure 1:
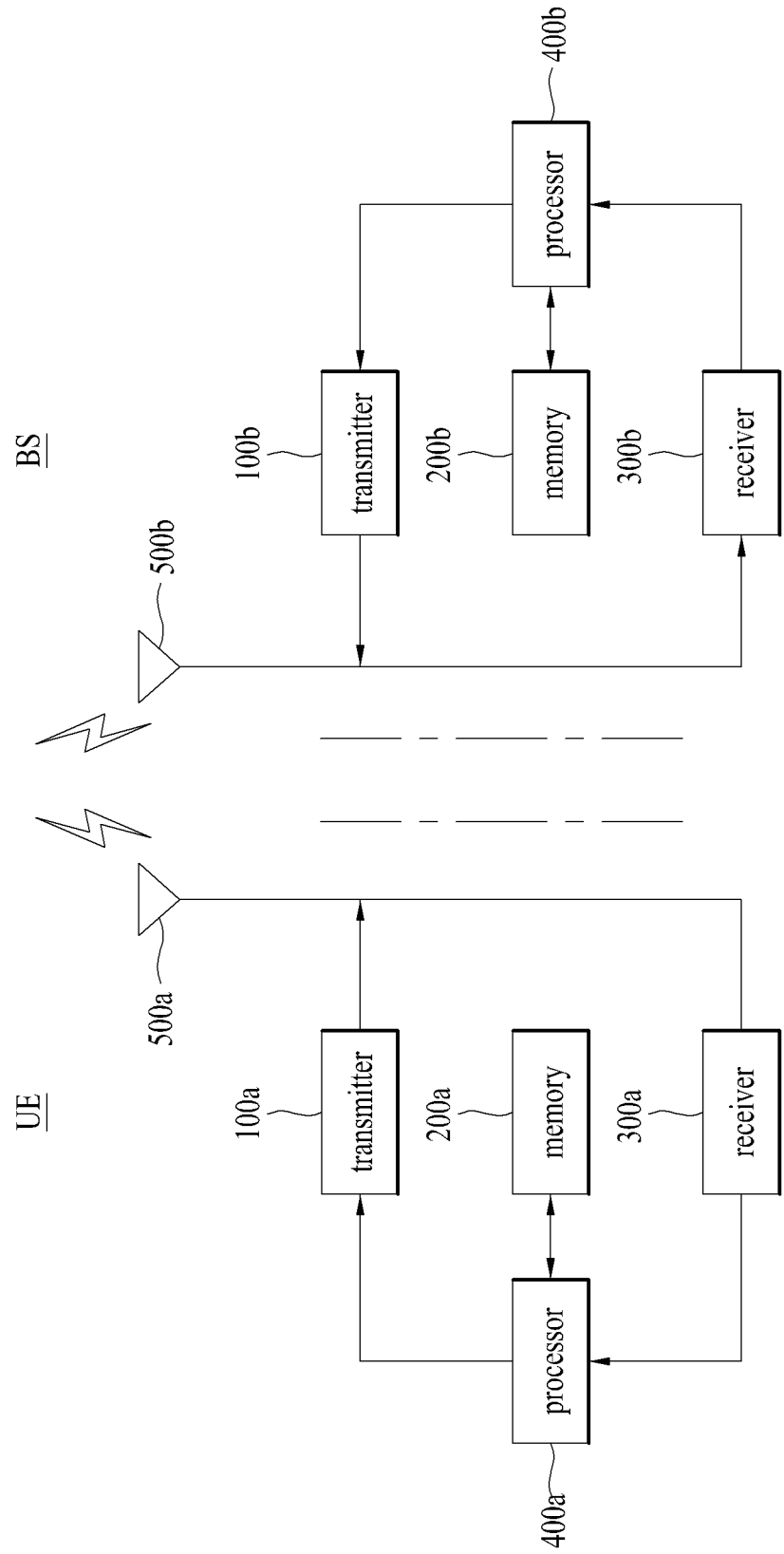
FIG. 1 is a block diagram of a User Equipment (UE) and an evolved Node B (eNB or eNode B) to which the present invention is applied.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, devices, and systems as set forth below are applicable to various wireless multiple access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi-Carrier Frequency Division Multiple Access (MC-FDMA), etc. CDMA may be implemented as a radio technology such as Universal Terrestrial Radio Access (UTRA) or CDMA2000. TDMA may be implemented as a radio technology such as Global System for Mobile communications/General Packet Radio Service/Enhanced Data Rates for GSM Evolution (GSM/GPRS/EDGE). OFDMA may be implemented as a radio technology such as IEEE 802.11 (Wi-Fi), IEEE 802.16 (WiMAX), IEEE 802.20, Evolved-UTRA (E-UTRA) etc. UTRAN is a part of Universal Mobile Telecommunication System (UMTS). $3^{rd}$ Generation Partnership Project (3GPP) Long Term Evolution (LTE) is a part of Evolved-UMTS (E-UMTS) using E-UTRAN. 3GPP LTE employs OFDMA for Downlink (DL) and SC-FDMA for Uplink (UL). LTE-Advanced (LTE-A) is an evolution of 3GPP LTE. For clarity of description, the following description focuses on the 3GPP LTE/LTE-A system. However, the technical features of the present invention are not limited thereto. For example, while the following detailed description is given in the context of the 3GPP LTE/LTE wireless communication system, it is applicable to other wireless communication system, except for features inherent to 3GPP LTE/LTE-A.

In some instances, known structures and devices are omitted or are shown in block diagram form, focusing on important features of the structures and devices, so as not to obscure the concept of the invention. The same reference numbers will be used throughout this specification to refer to the same parts.

In the present invention, a User Equipment (UE) is fixed or mobile. The UE is a device that transmits and receives user data and/or control information by communicating with a Base Station (BS). The term 'UE' may be replaced with 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc.

A BS is typically a fixed station that communicates with a UE or another BS. The BS exchanges data and control information with a UE and another BS. The term 'BS' may be replaced with 'evolved Node B (eNB or eNode B)', 'Base Transceiver System (BTS)', 'Access Point (AP)', etc.

In the present invention, allocation of a specific signal to a frame/subframe/slot/carrier/subcarrier amounts to transmission of the specific signal on the carrier/subcarrier during the period of the frame/subframe/slot or at the timing of the frame/subframe/slot.

In the present invention, a rank or a transmission rank is the number of layers that are multiplexed in or allocated to one Orthogonal Frequency Division Multiplexing (OFDM) symbol or one Resource Element (RE).

In the present invention, a Physical Downlink Control CHannel (PDCCH)/Physical Control Format Indicator CHannel (PCFICH)/Physical Hybrid automatic repeat request Indicator CHannel (PHICH)/Physical Downlink Shared CHannel (PDSCH) is a set of REs that carry Downlink Control Information (DCI)/a Control Format Indicator (CFI)/a DownLink ACKnowledgement/Negative ACKnowledgement (DL ACK/NACK) for an UpLink (UL) transmission/DL data.

A Physical Uplink Control CHannel (PUCCH)/Physical Uplink Shared CHannel (PUSCH)/Physical Random Access CHannel (PRACH) is a set of REs that carry Uplink Control Information (UCI)/UL data/a random access signal.

Particularly, REs allocated or belonging to the PDCCH/PCFICH/PHICH/PDSCH/PUCCH/PUSCH/PRACH are referred to as PDCCH REs/PCFICH REs/PHICH REs/PDSCH REs/PUCCH REs/PUSCH REs/PRACH REs or PDCCH resources/PCFICH resources/PHICH resources/PDSCH resources/PUCCH resources/PUSCH resources/PRACH resources in the present invention.

Accordingly, PUCCH/PUSCH/PRACH transmission from a UE amounts to transmission of UCI/UL data/a random access signal on the PUSCH/PUCCH/PRACH from the UE. In addition, PDCCH/PCFICH/PHICH/PDSCH transmission from an eNB amounts to transmission of DCI/DL data on the PDCCH/PCFICH/PHICH/PDSCH from the eNB.

Mapping ACK/NACK information to, a specific constellation point amounts to mapping the ACK/NACK information to a specific complex modulation symbol. Further, mapping ACK/NACK information to a specific complex modulation symbol amounts to modulating the ACK/NACK information to the specific complex modulation symbol.

FIG. 1 is a block diagram illustrating configurations of a UE and an eNB. The UE operates as a transmitter on a UL and as a receiver on a DL, whereas the eNB operates as a receiver on a UL and as a transmitter on a DL.

Referring to FIG. 1, the UE and the eNB include antennas 500a and 500b that receive information, data, signals, or messages, transmitters 100a and 100b that transmit information, data, signals, or messages by controlling the antennas 500a and 500b, receivers 300a and 300b that receive information, data, signals, or messages by controlling the antennas 500a and 500b, and memories 200a and 200b that temporarily or permanently store various types of information in a wireless communication system. Further, the UE and the eNB include processors 400a and 400b respectively, which are dynamically connected to components such as the transmitters 100a and 10b, the receivers 300a and 300b, and the memories 200a and 200b and configured to control these components.

Each of the transmitter 100a, the receiver 300a, the memory 200a, and the processor 400a in the UE may be configured independently on a separate chip, or two or more of them may be configured on one chip. Each of the transmitter 100b, the receiver 300b, the memory 200b, and the processor 400b in the eNB may be configured independently on a separate chip, or two or more of them may be configured on one chip. The transmitter and the receiver may be incorporated into a single transceiver in the UE or the eNB.

The antennas 500a and 500b transmit signals generated from the transmitters 100a and 100b to the outside or provide external received signals to the receivers 300a and 300b. The antennas 500a and 500b may also be called antenna ports. An antenna port may be configured with one or more physical antennas. If a transceiver supports Multiple Input Multiple Output (MIMO) for data transmission and reception through a plurality of antennas, the transceiver may be connected to two or more antennas.

The processor 400a or 400b provides overall control to each component or module of the UE or the eNB. Particularly, the processors 400a and 400b may perform various control functions to implement the present invention, a Medium Access Control (MAC) frame conversion control function based on Quality of Service (QoS) and a propagation environment, a power saving function to control an idle-mode operation, a handover function, an authentication and encryption function, etc. The processors 400a and 400b may be referred to as controllers, microcontrollers, microprocessors, microcomputers, etc. The processors 400a and 400b may be implemented in hardware, firmware, software, or a combination of them.

If the present invention is implemented in hardware, the processors 400a and 400b may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. which are configured so as to perform the present invention.

If the present invention is implemented in firmware or software, the firmware or the software may be configured in the form of a module, a procedure, a function, etc. performing the functions or operations of the present invention. The firmware or software may be provided in the processor 400a and 400b or may be stored in the memories 200a and 200b and executed by the processors 400a and 400b.

The transmitters 100a and 100b encode and modulate a transmission signal or transmission data that is scheduled by the processors 400a and 400b or schedulers connected to the processors 400a and 400b, in a predetermined coding and modulation scheme and then provide the modulated signal or data to the antennas 500a and 500b. The transmitters 100a and 100b and the receivers 300a and 300b of the UE and the eNB may be configured differently depending on operations for processing a transmission signal and a received signal.

The memories 200a and 200b may store programs for processing and controlling in the processors 400a and 400b and may temporarily store input and output information. The memories 200a and 200b may serve as buffers. The memories 200a and 200b may be configured with a flash memory type, a hard disk type, a multimedia card micro type, a card type memory (e.g. a Secure Digital (SD) memory or an eXtreme Digital (XD) memory), a Random Access Memory (RAM), a Static Random Access. Memory (SRAM), a Read Only Memory (ROM), an Electrically Erasable Programmable Read Only Memory (EEPROM), a Programmable Read Only Memory (PROM), a magnetic memory, a magnetic disk, an optical disk, etc.

Figure 2:
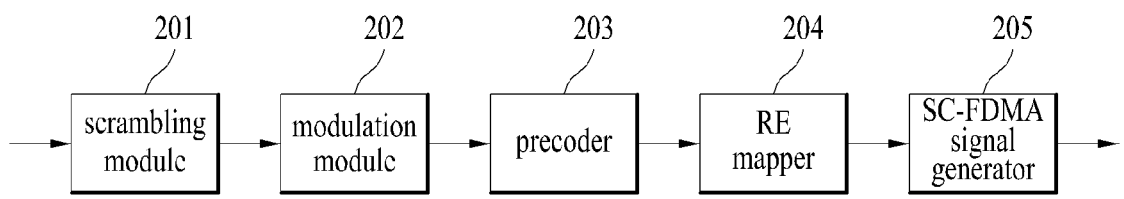
FIG. 2 illustrates a signal processing operation for transmitting an uplink signal at a UE.

FIG. 2 illustrates a signal processing operation for transmitting a UL signal at a UE. Referring to FIG. 2, the transmitter 100a of the UE may include a scrambling module 201, a modulation mapper 202, a precoder 203, an RE mapper 204, and an SC-FDMA signal generator 205.

To transmit a UL signal, the scrambling module 201 may scramble a transmission signal with a scrambling signal. The modulation mapper 202 modulates the scrambled signal to complex modulation symbols in Binary Phase Shift Keying (BPSK), Quadrature Phase Shift Keying (QPSK), or 16-ary/64-ary Quadrature Amplitude Modulation (16QAM/64QAM) according to the type of the transmission signal or a channel state. The precoder 203 precodes the complex modulation symbols and the RE mapper 204 maps the complex modulation symbols to time-frequency REs. Subsequently, the SC-FDMA signal generator 205 may transmit the processed signal to an eNB through an antenna port.

Figure 3:
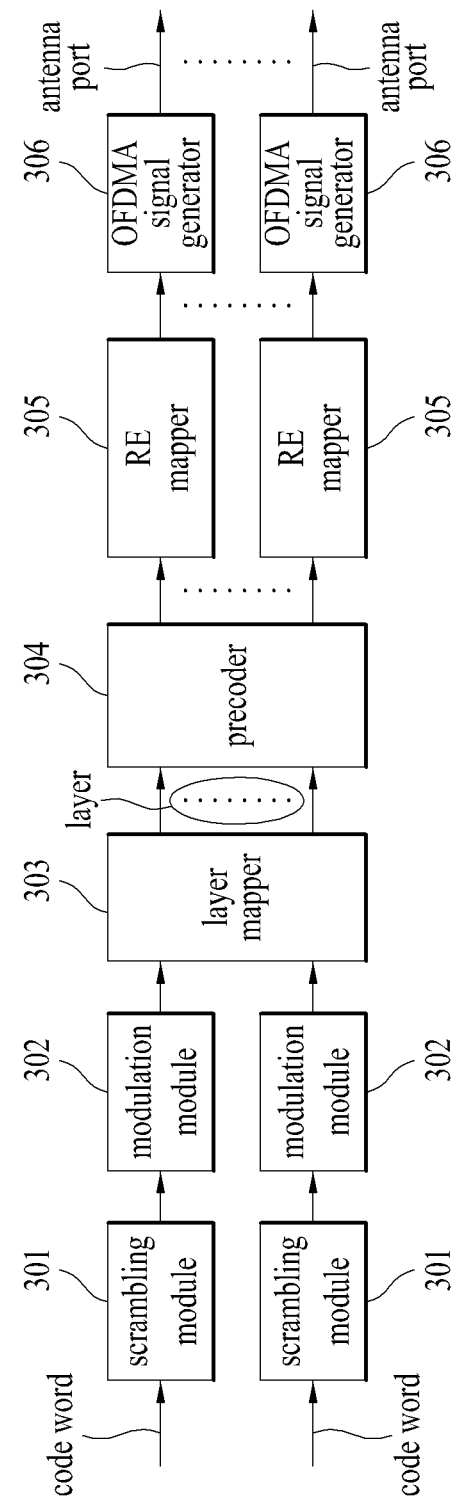
FIG. 3 illustrates a signal processing operation for transmitting a downlink signal at an eNB.

FIG. 3 illustrates a signal processing operation for transmitting a DL signal at an eNB. Referring to FIG. 3, the transmitter 100b of the transmitter may include scrambling modules 301, modulation mappers 302, a layer mapper 303, a precoder 304, RE mappers 305, and OFDMA signal generators 306.

To transmit a DL signal or one or more DL codewords, the scrambling modules 301 may scramble the signal or the codewords and the modulation mappers 302 may modulate the scrambled signal or codewords to complex modulation symbols, as is done in the UE illustrated in FIG. 2. The layer mapper 303 may map the complex modulation symbols to a plurality of layers. The precoder 304 may multiply the layers by a precoding matrix and allocate the products to respective transmission antennas. The RE mappers 305 may map the antenna-specific transmission signals to time-frequency REs. The OFDMA signal generators 306 may transmit the processed signals through respective antenna ports.

Compared to DL signal transmission from an eNB, a Peak-to-Average Power Ratio (PAPR) becomes a problem with UL signal transmission from a UE. As described before with reference to FIGS. 2 and 3, a UL signal is transmitted in SC-FDMA, while a DL signal is transmitted in OFDMA.

Figure 4:
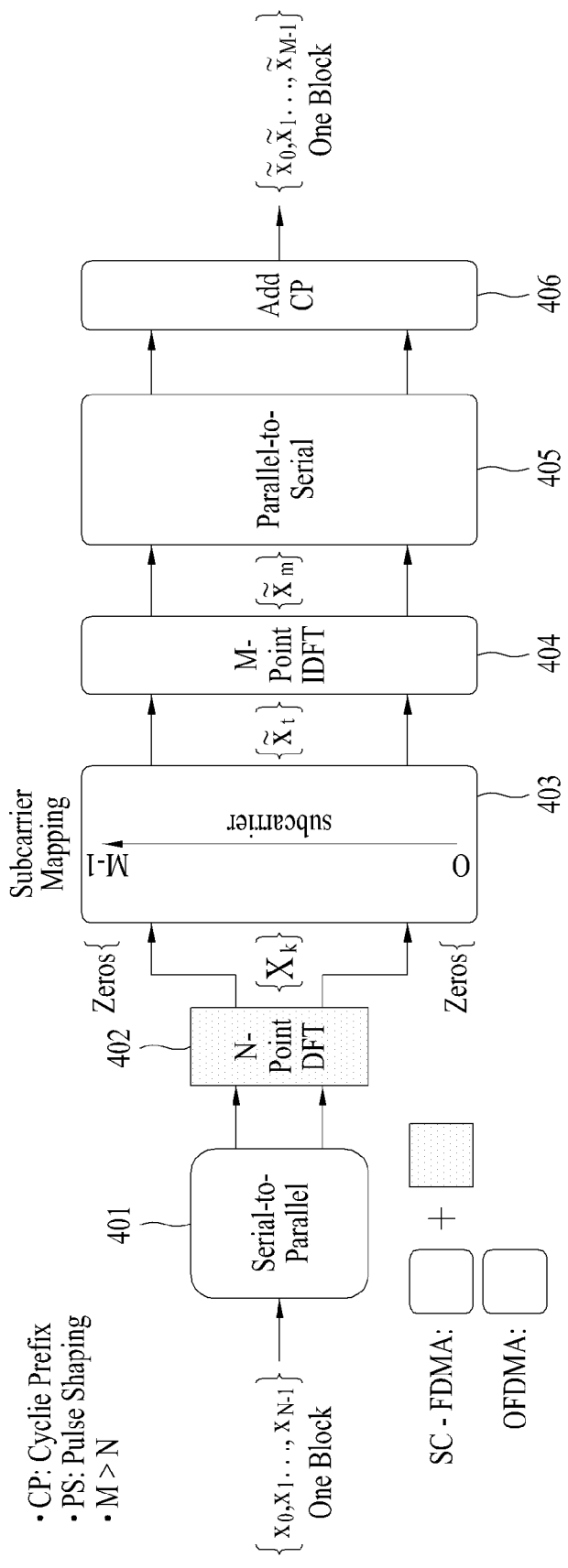
FIG. 4 illustrates Single Carrier Frequency Division Multiple Access (SC-FDMA) and Orthogonal Frequency Division Multiple Access (OFDMA) to which the present invention is applied.

FIG. 4 illustrates SC-FDMA and OFDMA to which the present invention is applied. The 3GPP system adopts OFDMA for DL and SC-FDMA for UL.

Referring to FIG. 4, a UE and an eNB are common in that each of the UE and the eNB has a serial-to-parallel converter 401, a subcarrier mapper 403, an M-point Inverse Discrete Fourier Transform (IDFT) module 404, and a Cyclic Prefix (CP) adder 406 in order to transmit a UL signal or a DL signal. To transmit a signal in SC-FDMA, the UE further includes an N-point Discrete Fourier Transform (DFT) module 402. The N-point DFT module 402 counterbalances the effects of IDFT of the IDFT module 404 to some extent so that the transmission signal takes a single carrier property.

SC-FDMA should satisfy the single carrier property. FIG. 5 illustrates examples of mapping input symbols to subcarriers in a frequency domain in a manner that satisfies the single carrier property. If DFT symbols are allocated to subcarriers in the mapping scheme illustrated in FIG. 5(a) or 5(b), a transmission signal satisfying the single carrier property may be achieved. FIG. 5(a) illustrates a localized mapping scheme and FIG. 5(b) illustrates a distributed mapping scheme.

Figure 6:
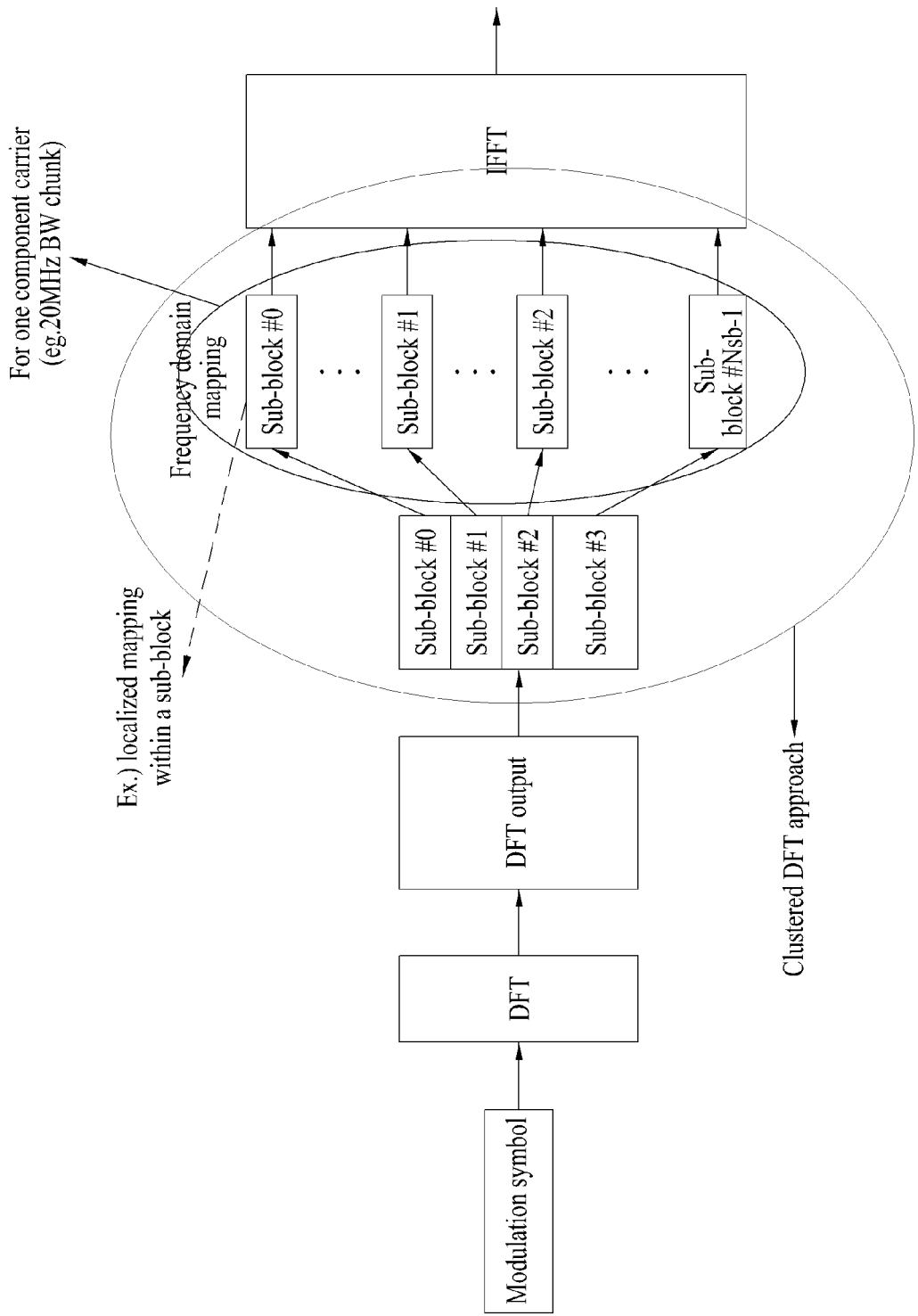
FIG. 6 illustrates a signal processing operation for mapping Discrete Fourier Transform (DFT) output samples to a single carrier in clustered SC-FDMA.
Figure 7:
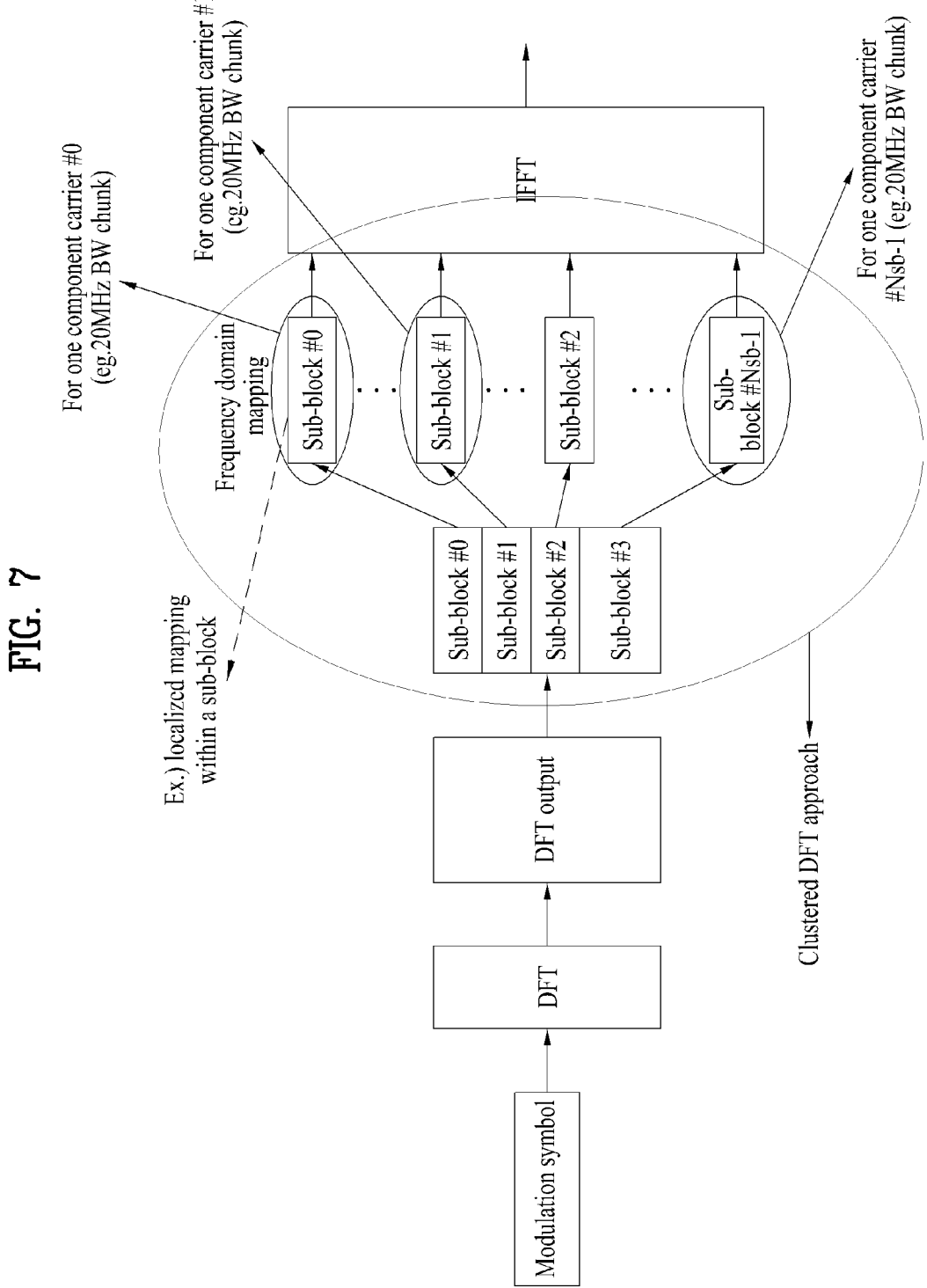
FIGS. 7 and 8 illustrate signal processing operations for mapping DFT output samples to multiple carriers in clustered SC-FDMA.
Figure 8:
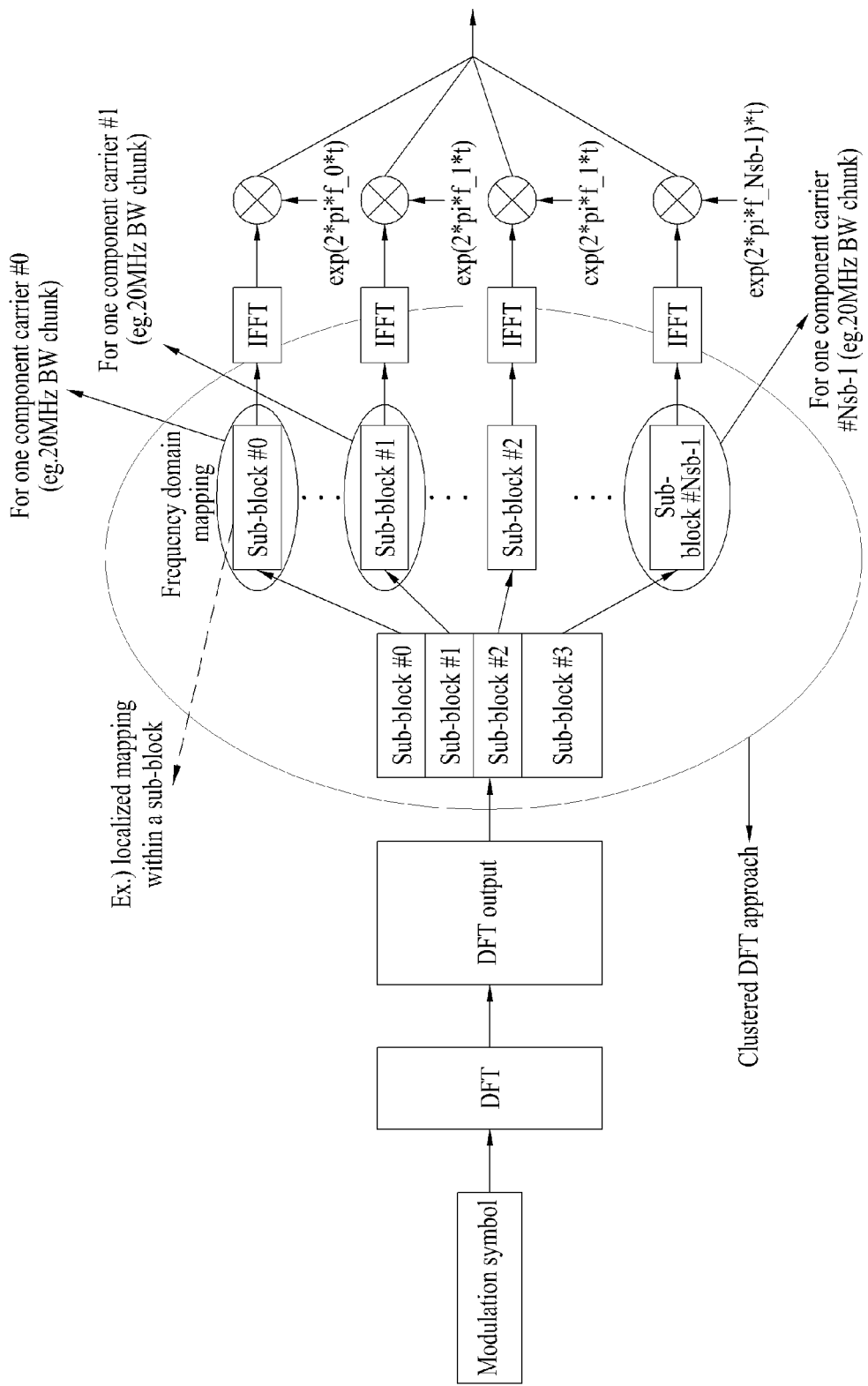

A so-called Clustered DFT-spread-OFDM (DFT-s-OFDM) scheme may be used in the transmitters 100a and 100b. In clustered DFT-s-OFDM modified from the existing SC-FDMA scheme, a precoded signal is divided into a plurality of sub-blocks and mapped to non-contiguous subcarriers. FIGS. 6, 7 and 8 illustrate examples of mapping input symbols to a single carrier in DFT-s-OFDM.

FIG. 6 illustrates a signal processing operation for mapping DFT output samples to a single carrier in clustered SC-FDMA and FIGS. 7 and 8 illustrate signal processing operations for mapping DFT output samples to multiple carriers in clustered SC-FDMA. FIG. 6 illustrates an example of intra-carrier clustered SC-FDMA and FIGS. 7 and 8 illustrate examples of inter-carrier clustered SC-FDMA. In FIG. 7, with contiguous Component Carriers (CCs) allocated in the frequency domain, if a subcarrier spacing is aligned between adjacent CCs, a signal is generated from a single IFFT block. In FIG. 8, with non-contiguous CCs allocated in the frequency domain, signals are generated from a plurality of IFFT blocks.

Figure 9:
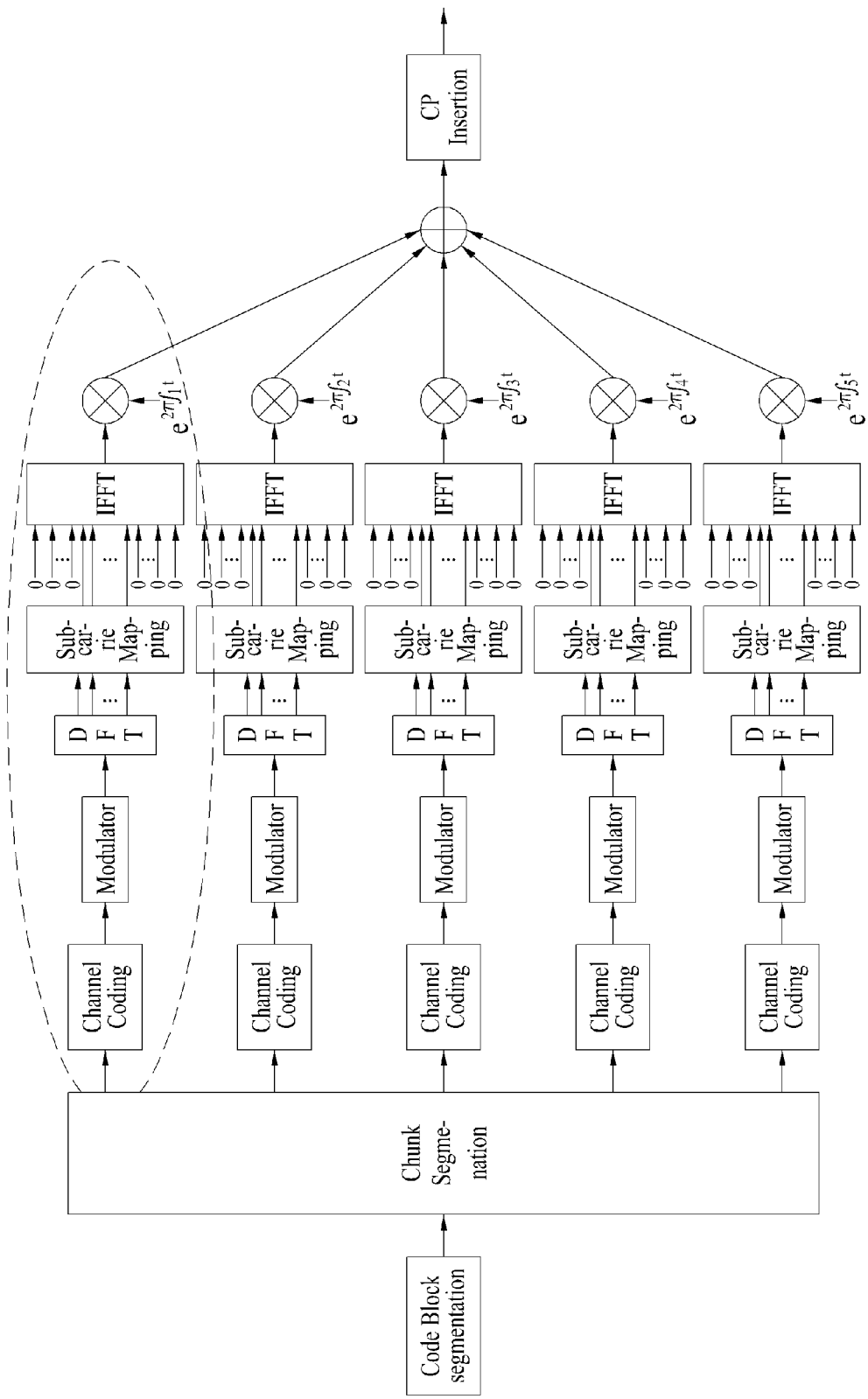
FIG. 9 illustrates a signal processing operation in segmented SC-FDMA.

FIG. 9 illustrates a signal processing operation in segmented SC-FDMA.

In segmented SC-FDMA, as many IFFT modules as the number of DFT modules are used. Thus, as DFT modules are mapped to IFFT modules in a one-to-one correspondence, segmented SC-FDMA is a simple extension of the DFT spreading and IFFT frequency subcarrier mapping configuration of the existing SC-FDMA. Segmented SC-FDMA is also referred to as N×SC-FDMA or N×DFT-s-OFDMA.

Herein, N×SC-FDMA and N×DFT-s-OFDMA are uniformly called segmented SC-FDMA. Referring to FIG. 9, to relieve the single carrier property constraint, total time-domain modulation symbols are grouped into N groups (N is an integer larger than 1) and DFT-processed on a group basis in segmented SC-FDMA.

Figure 10:
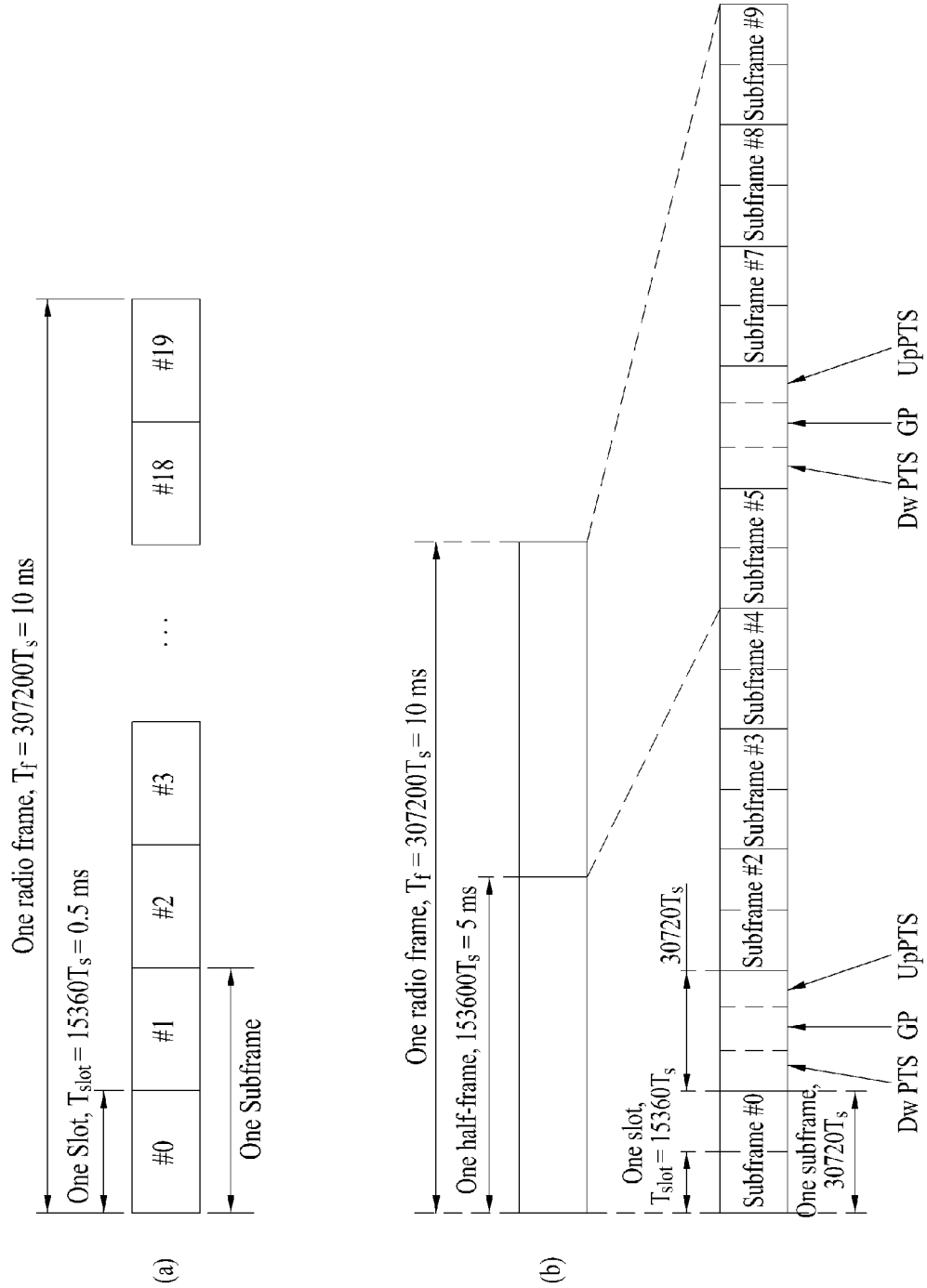
FIG. 10 illustrates exemplary radio frame structures in a wireless communication system.

FIG. 10 illustrates exemplary radio frame structures in a wireless communication system. Specifically, FIG. 10(a) illustrates an exemplary radio frame of Frame Structure type 1 (FS-1) in the 3GPP LTE/LTE-A system and FIG. 10(b) illustrates an exemplary radio frame of Frame Structure type 2 (FS-2) in the 3GPP LTE/LTE-A system. The frame structure illustrated in FIG. 10(a) may apply to a Frequency Division Duplex (FDD) mode and a Half FDD (H-FDD) mode, and the frame structure illustrated in FIG. 10(b) may apply to a Time Division Duplex (TDD) mode.

Referring to FIG. 10, a 3GPP LTE/LTE-A radio frame is 10 ms ($327200T_s$) long and divided into 10 equal-sized subframes. The 10 subframes of a radio frame may be indexed. Herein, $T_s$ represents a sampling time and $T_s=1/(2048 \times 15$ kHz). Each subframe is 1 ms long, including two slots. The 20 slots of a radio frame may be indexed sequentially from 0 to 19. Each slot is 0.5 ms long. A unit time over which one subframe is transmitted is defined as a Transmission Time Interval (TTI). Time resources may be identified by a radio frame number (or a radio frame index), a subframe number (or a subframe index), a slot number (or a slot index), etc.

Different radio frames may be configured for different duplexing modes. For example, DL transmission and UL transmission are distinguished by frequency in the FDD mode and thus a radio frame includes only DL subframes or UL subframes.

Compared to the FDD radio frame, a TDD radio frame is divided into UL subframes and DL subframes because DL transmission and UL transmission are distinguished by time in the TDD mode.

Figure 11:
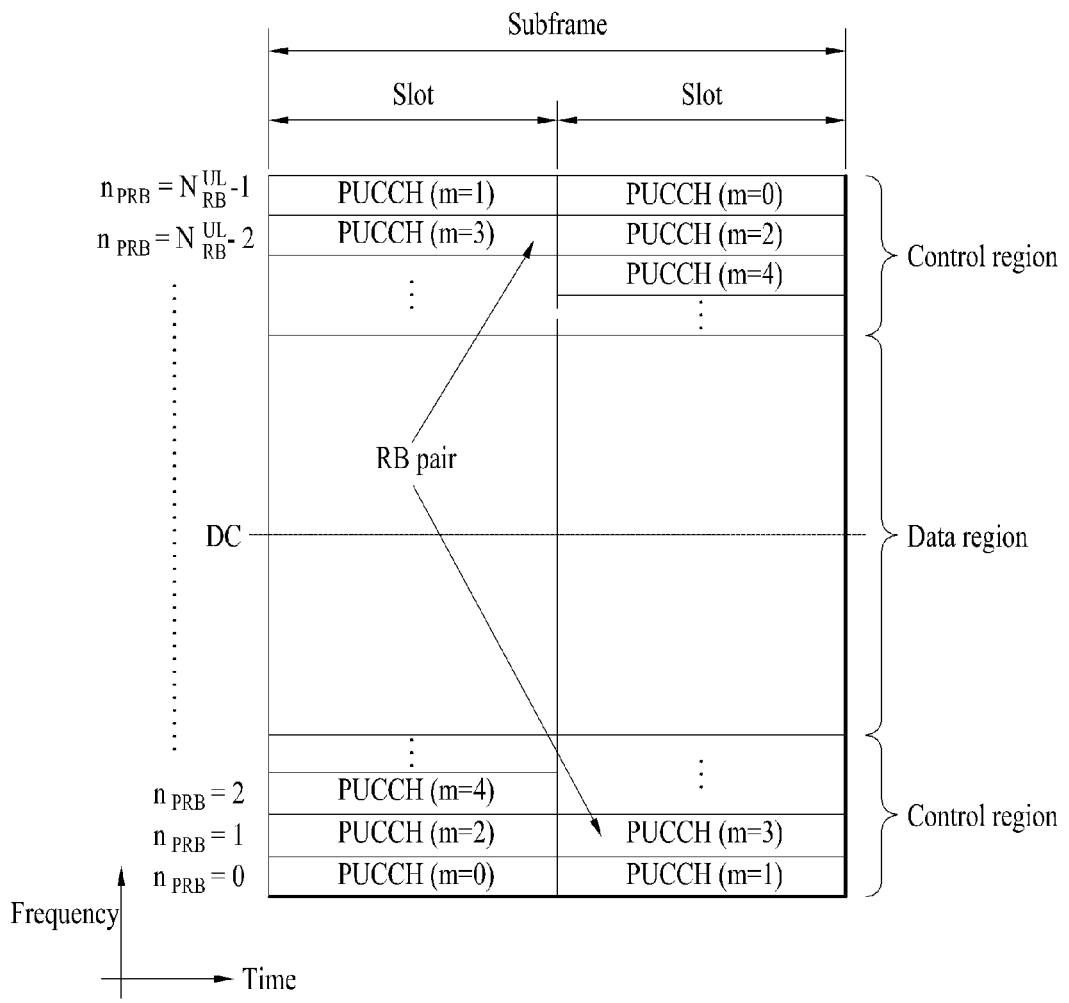
FIG. 11 illustrates an uplink subframe structure.

FIG. 11 illustrates a UL subframe structure to which the present invention is applied. Referring to FIG. 11, a UL subframe may be divided into a data region and a control region in the frequency domain. At least one PUCCH may be allocated to the control region to transmit UCI. At least one PUSCH may be allocated to the data region to transmit user data. If a UE operates in SC-FDMA in conformance to LTE release 8 or release 9, the UE may not transmit a PUCCH and a PUSCH simultaneously in order to maintain the single carrier property.

The size and usage of UCI delivered on a PUCCH are different according to a PUCCH format. The size of UCI may also be changed according to a coding rate. For example, the following PUCCH formats may be defined.

(1) PUCCH format 1: modulated in On-Off Keying (OOK) and used for Scheduling Request (SR) transmission;

(2) PUCCH formats 1a and 1b: used for ACK/NACK information transmission;

1) PUCCH format 1a: 1-bit ACK/NACK information modulated in BPSK; and

2) PUCCH format 1b: 2-bit ACK/NACK information modulated in QPSK;

(3) PUCCH format 2: modulated in QPSK and used for Channel Quality Indicator (CQI) transmission; and (4) PUCCH formats 2a and 2b: used for simultaneous transmission of CQI information and ACK/NACK information.

[Table 1] lists modulation schemes and the numbers of bits per subframe for PUCCH formats, [Table 2] lists the numbers of Reference Signals (RSs) per slot for PUCCH formats, and [Table 3] lists the positions of SC-FDMA symbols at which RSs are arranged, for PUCCH formats. In [Table 1], PUCCH formats 2a and 2b are for a normal CP case.

TABLE 1

| PUCCH format | Modulation | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH format | Normal CP | Extended CP |
|---|---|---|
| 1, 1a, 1b | 3 | 2 |
| 2 | 2 | 1 |
| 2a, 2b | 2 | N/A |

TABLE 3

| | Positions of SC-FDMA symbols for RSs | |
|---|---|---|
| PUCCH format | Normal CP | Extended CP |
| 1, 1a, 1b | 2, 3, 4 | 2, 3 |
| 2, 2a, 2b | 1, 5 | 3 |

Subcarriers far from a Direct Current (DC) subcarrier are used for the control region of a UL subframe. That is, subcarriers at both ends of a UL transmission bandwidth are allocated for transmission of UCI. The DC subcarrier, which is not used for signal transmission, is mapped to a carrier frequency $f_0$ during frequency upconversion in an OFDMA/SC-FDMA signal generator.

A PUCCH for a UE is allocated to an RB pair in a subframe, the RBs of the RB pair occupying different subcarriers in the two slots of the subframe. It is said that the RB pair allocated to the PUCCH is frequency-hopped over a slot boundary. If frequency hopping is not used, the RB pair occupies the same subcarriers in the two slots. Since a PUCCH for a UE is allocated to an RB pair in a subframe irrespective of frequency hopping, the same PUCCH is transmitted twice in the subframe, each RB of the RB pair in one slot.

An RB pair used for PUCCH transmission in a subframe is referred to as a PUCCH region. The PUCCH region and a code used in the PUCCH region are collectively referred to as PUCCH resources. That is, different PUCCH resources may be positioned in different PUCCH regions or may have different codes in the same PUCCH region. For the convenience of description, a PUCCH carrying ACK/NACK information is referred to as an ACK/NACK PUCCH, a PUCCH carrying CQI/Precoding Matrix Index (PMI)/Rank Indicator (RI) information is referred to as a CQI/PMI/RI PUCCH, and a PUCCH carrying SR information is referred to as an SR PUCCH.

An eNB allocates PUCCH resources to a UE explicitly or implicitly so that the UE may transmit UCI in the PUCCH resources.

UCI such as ACK/NACK information, CQI information, PMI information, RI information, and SR information may be transmitted in the control region of a UL subframe.

In a wireless communication system, a UE and an eNB transmit and receive signals or data to and from each other. When the eNB transmits data to the UE, the UE decodes the received data. If the data decoding is successful, the UE transmits an ACK to the eNB. On the contrary, if the data decoding is failed, the UE transmits a NACK to the eNB. The same thing applies to the opposite case. That is, when the UE transmits data to the eNB, the eNB transmits an ACK/NACK for the received data in the same manner as the UE. In the 3GPP LTE system, the UE receives a PDSCH from the eNB and transmits an ACK/NACK for the received PDSCH to the eNB on a PUCCH implicitly determined by a PDCCH carrying scheduling information about the PDSCH. If the UE fails to receive data on the PDSCH, this state may be considered to be a Discontinuous Transmission (DTX) state. In this case, the DTX state is handled as no data reception or the same state as a NACK (data reception but failed decoding) according to a predetermined rule.

Figure 12:
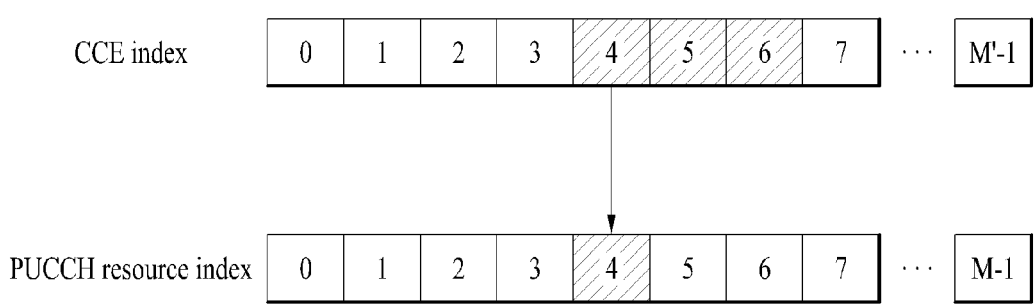
FIG. 12 illustrates an operation for determining a Physical Uplink Control CHannel (PUCCH) to carry an ACKnowledgement/Negative ACKnowledgement (ACK/NACK)

FIG. 12 illustrates an operation for determining a PUCCH that will deliver an ACK/NACK, to which the present invention is applied.

A plurality of PUCCH resources are shared among a plurality of UEs in a cell at each time point, rather than PUCCH resources for an ACK/NACK are allocated to each UE in advance. Specifically, PUCCH resources in which a UE will transmit an ACK/NACK are determined implicitly by a PDCCH carrying scheduling information about DL data related to the ACK/NACK. A total region carrying PDCCHs in each DL subframe includes a plurality of CCEs and a PDCCH directed to the UE includes one or more CCEs. A CCE includes a plurality of Resource Element Groups (REGs) (e.g. 9 REGs). One REG includes four successive REs except for REs carrying RSs. The UE transmits an ACK/NACK in PUCCH resources that are implicitly determined or calculated by a function of a specific CCE (e.g. a first CCE or a CCE with a lowest index) from among the CCEs of the received PDCCH.

Referring to FIG. 12, the lowest CCE index of a PDCCH is mapped to a PUCCH resource index for ACK/NACK transmission. If scheduling information about a PDSCH is delivered to a UE on a PDCCH including CCEs #4, #5, and #6 as illustrated in FIG. 12, the UE transmits to the eNB an ACK/NACK in PUCCH resource #4 mapped to CCE #4 which is the first of the CCEs of the PDCCH.

FIG. 12 illustrates an exemplary case in which there are up to M PUCCH resources in a UL subframe, for a DL subframe having up to M' CCEs. While M' may be equal to M, M' and M may be different and thus the CCEs may be mapped to the PUCCH resources in an overlapped manner. For example, PUCCH resource indexes may be determined by the following equation.

$$n^{(1)}_{PUCCH} = n_{CCE} + N^{(1)}_{PUCCH}$$ [Equation 1]

where $n^{(1)}_{PUCCH}$ is a PUCCH resource index for ACK/NACK transmission, $N^{(1)}_{PUCCH}$ is a value indicated by higher-layer signaling, and $n_{CCE}$ is the lowest of CCE indexes used for PDCCH transmission.

Figure 13:
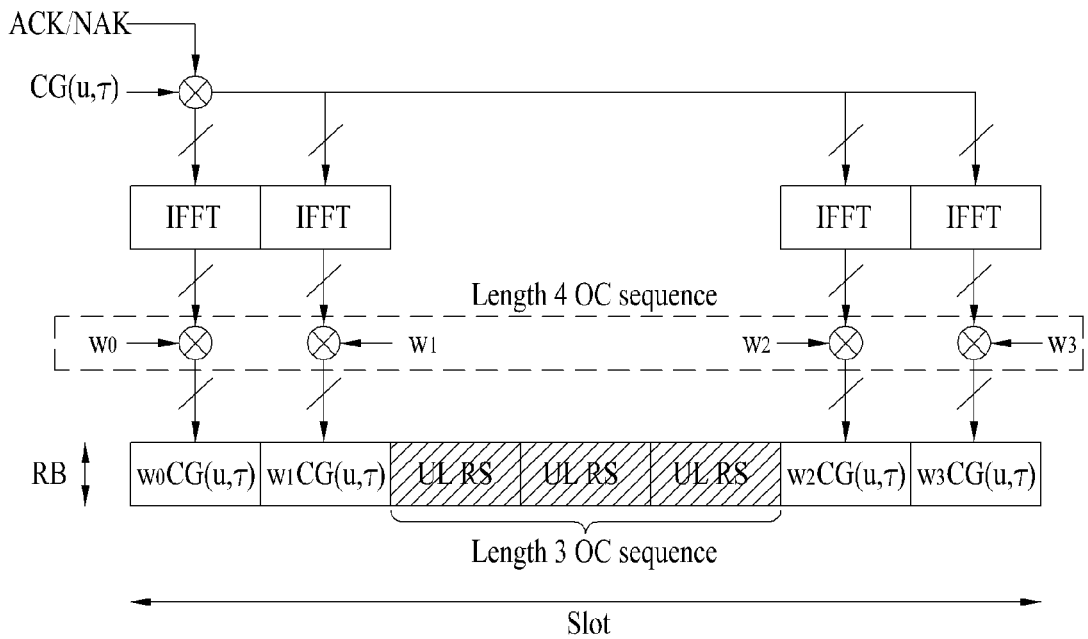
FIGS. 13 and 14 illustrate slot-level structures of PUCCH format 1a and PUCCH format 1b, respectively for ACK/NACK transmission.
Figure 14:
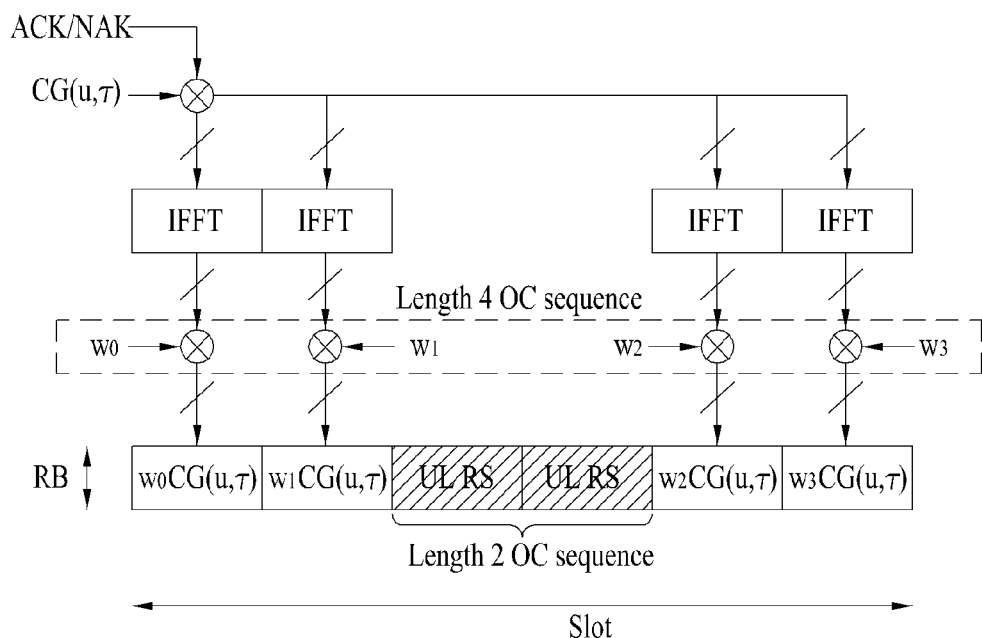

FIGS. 13 and 14 illustrate slot-level structures of PUCCH format 1a and PUCCH format 1b, for ACK/NACK transmission.

FIG. 13 illustrates PUCCH formats 1a and 1b in a normal CP case and FIG. 14 illustrates PUCCH formats 1a and 1b in an extended CP case. In PUCCH formats 1a and 1b, the same UCI is repeated on a slot basis in a subframe. A UE transmits an ACK/NACK signal in different resources defined by a different Cyclic Shift (CS) (frequency-domain code) of a Computer-Generated Constant Amplitude Zero Auto Correlation (CG-CAZAC) sequence and a different Orthogonal Cover (OC) or Orthogonal Cover Code (OCC) (time-domain spreading code). The OC may be, for example, a Walsh/DFT orthogonal code. Given 6 CSs and 3 OCs, a total of 18 UEs may be multiplexed into the same Physical Resource Block (PRB) in a single antenna case. An orthogonal sequence w0, w1, w2, w3 may apply to the time domain (after FFT modulation) or to the frequency domain (before FFT modulation). The slot-level structure of PUCCH format 1 for SR transmission is identical to that of PUCCH formats 1a and 1b, except for a modulation scheme.

PUCCH resources defined by a CS, an OC, a PRB, and an RS may be allocated to a UE by RRC signaling, for transmission of SR information and an ACK/NACK for Semi-Persistent Scheduling (SPS). As described before with reference to FIG. 12, PUCCH resources may be allocated to a UE implicitly using the lowest CCE index of a PDCCH corresponding to a PDSCH or the lowest CCE index of an SPS-releasing PDCCH, for a dynamic ACK/NACK feedback (or an ACK/NACK feedback for non-persistent scheduling) and an ACK/NACK feedback for the SPS-releasing PDCCH.

Figure 15:
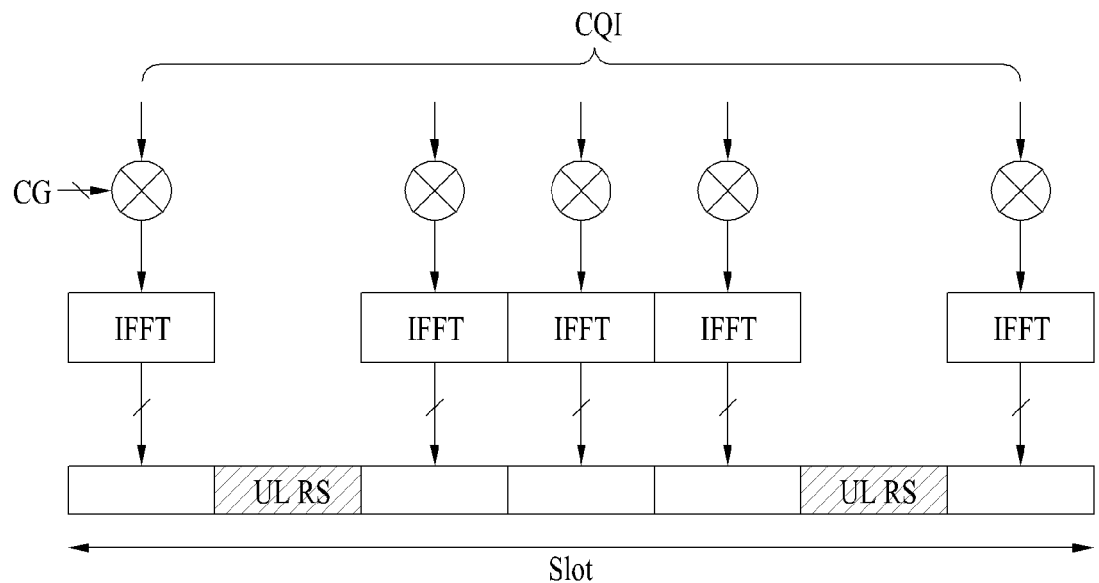
FIG. 15 illustrates PUCCH format 2/2a/2b in a normal Cyclic Prefix (CP) case.
Figure 16:
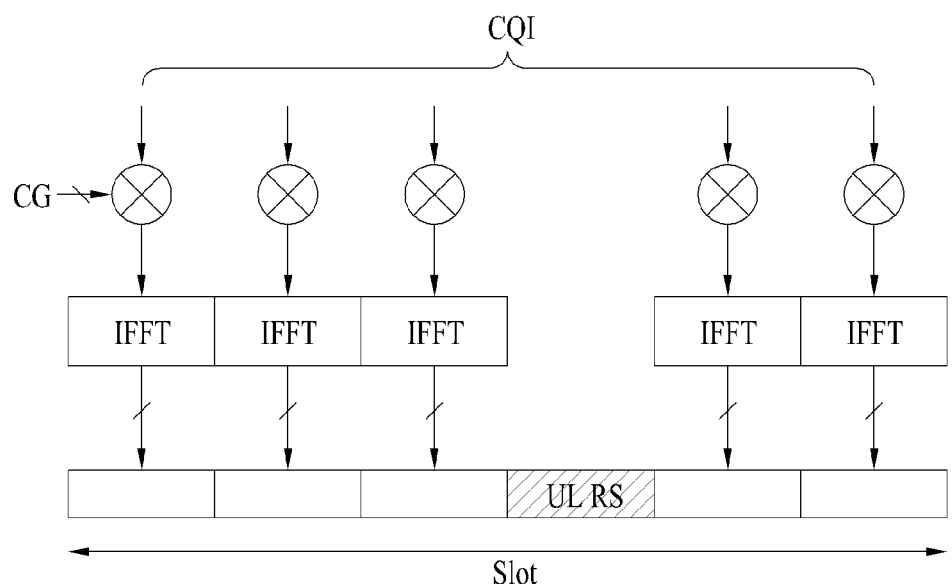
FIG. 16 illustrates PUCCH format 2/2a/2b in an extended CP case.

FIG. 15 illustrates PUCCH format 2/2a/2b in a normal CP case and FIG. 16 illustrates PUCCH format 2/2a/2b in an extended CP case. Referring to FIGS. 15 and 16, one subframe includes 10 QPSK data symbols except for RS symbols in the normal CP case. Each QPSK symbol is spread by a CS in the frequency domain and then mapped to a corresponding SC-FDMA symbol. SC-FDMA symbol-level CS hopping may be used to randomize inter-cell interference. RSs may be multiplexed in Code Division Multiplexing (CDM) using CSs. For example, given 12 or 6 CSs, 12 or 6 UEs may be multiplexed into the same PRB. That is, a plurality of UEs may be multiplexed using CS+OC+PRB and CS+PRB respectively in PUCCH format 1/1a/1b and PUCCH format 2/2a/2b.

Length-4 orthogonal sequences (i.e. OCs) and length-3 orthogonal sequences (i.e. OCs) available to PUCCH format 1/1a/1b are illustrated in [Table 4] and [Table 5], respectively.

TABLE 4

| Sequence index | Orthogonal sequence |
| --- | --- |
| 0 | [+1 +1 +1 +1] |
| 1 | [+1 −1 +1 −1] |
| 2 | [+1 −1 −1 +1] |

TABLE 5

| Sequence index | Orthogonal sequence |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequences (i.e. OCs) for RSs in PUCCH format 1/1a/1b are given as illustrated in [Table 6]

TABLE 6

| Sequence index | Normal CP | Extended CP |
| --- | --- | --- |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for PUCCH formats 1a and 1b. In FIG. 14, $\Delta_{shift}^{PUCCH} = 2$.

Figure 18:
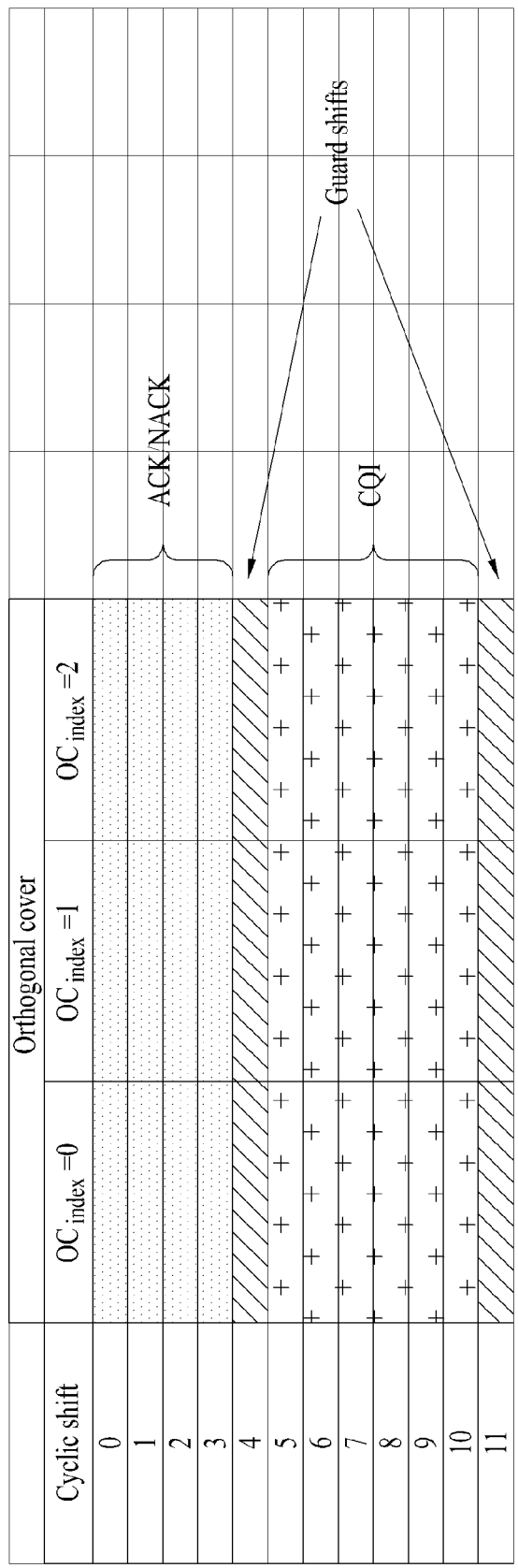
FIG. 18 illustrates channelization for PUCCH format 1/1a/1b and PUCCH format 2/2a/2b which are combined in the same Physical Resource Block (PRB)

FIG. 18 illustrates channelization for PUCCH format 1/1a/1b and PUCCH format 2/2a/2b that are combined in the same PRB.

CS hopping and OC remapping may be performed in the following manner:

(1) symbol-based cell-specific CS hopping for inter-cell interference randomization; and (2) slot-level CS hopping/OC remapping
  1) for inter-cell interference randomization; and
  2) slot-based approach for mapping between an ACK/NACK channel and resource k.

Resources $n_r$ for PUCCH format 1/1a/1b include the following set:

(1) CS (=DFT orthogonal code at symbol level) ($n_{cs}$);
(2) OC (orthogonal cover at slot level) ($n_{oc}$); and
(3) frequency RB ($n_{rb}$).

Let the indexes of a CS, an OC, and an RB be denoted by $n_{cs}$, $n_{oc}$, and $n_{rb}$, respectively. Then a representative index $n_r$ includes $n_{cs}$, $n_{oc}$, and $n_{rb}$. That is, $n_r=(n_{cs}, n_{oc}, \text{and } n_{rb})$.

A set of a CQI, a PMI, and an RI and a set of a CQI and an ACK/NACK may be transmitted in PUCCH format 2/2a/2b. Herein, Reed Muller (RM) coding may be used.

For example, a UL CQI may be channel-encoded in the LTE system, as follows. First, a bit stream $a_0$, $a_1$, $a_2$, $a_3$, ..., $a_{A-1}$ is channel-encoded with a (20, A) RM code. [Table 7] lists base sequences for the (20, A) code. $a_0$ and $a_{A-1}$ are the Most Significant Bit (MSB) and Least Significant Bit (LSB) of the bit stream, respectively. In the extended CP case, the maximum number of transmission bits is 11, aside from the case of simultaneous CQI and ACK/NACK transmission. The bit stream may be encoded to 20 bits using the RM code and then modulated in QPSK. Before QPSK modulation, the coded bits may be scrambled.

[Table 8] illustrates a UCI field for a wideband CQI feedback (a CQI feedback for a PDSCH transmitted through a single antenna port, by transmit diversity, or by open-loop spatial multiplexing).

TABLE 8

| Field | Band |
|---|---|
| Wideband CQI | 4 |

[Table 9] illustrates UCI fields for a wideband CQI and PMI feedback. These fields report about PDSCH transmission in closed-loop spatial multiplexing.

TABLE 9

| | Band | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI | 2 | 1 | 4 | 4 |

[Table 10] illustrates a UCI field for an RI feedback in wideband reporting.

TABLE 7

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

The channel-coded bits $b_0$, $b_1$, $b_2$, $b_3$, ..., $b_{B-1}$ may be generated by the following equation.

$$b_i = \sum_{n=0}^{A-1} (a_n \cdot M_{i,n}) \bmod 2 \quad \text{[Equation 2]}$$

where I=0, 1, 2, ..., B−1.

TABLE 10

| Field | Bit widths | | |
|---|---|---|---|
| Field | 2 antenna ports | 4 antenna pots | |
| | 2 antenna ports | Maxim 2 layers | Maximum 4 layers |
| RI | 1 | 1 | 2 |

Figure 19:
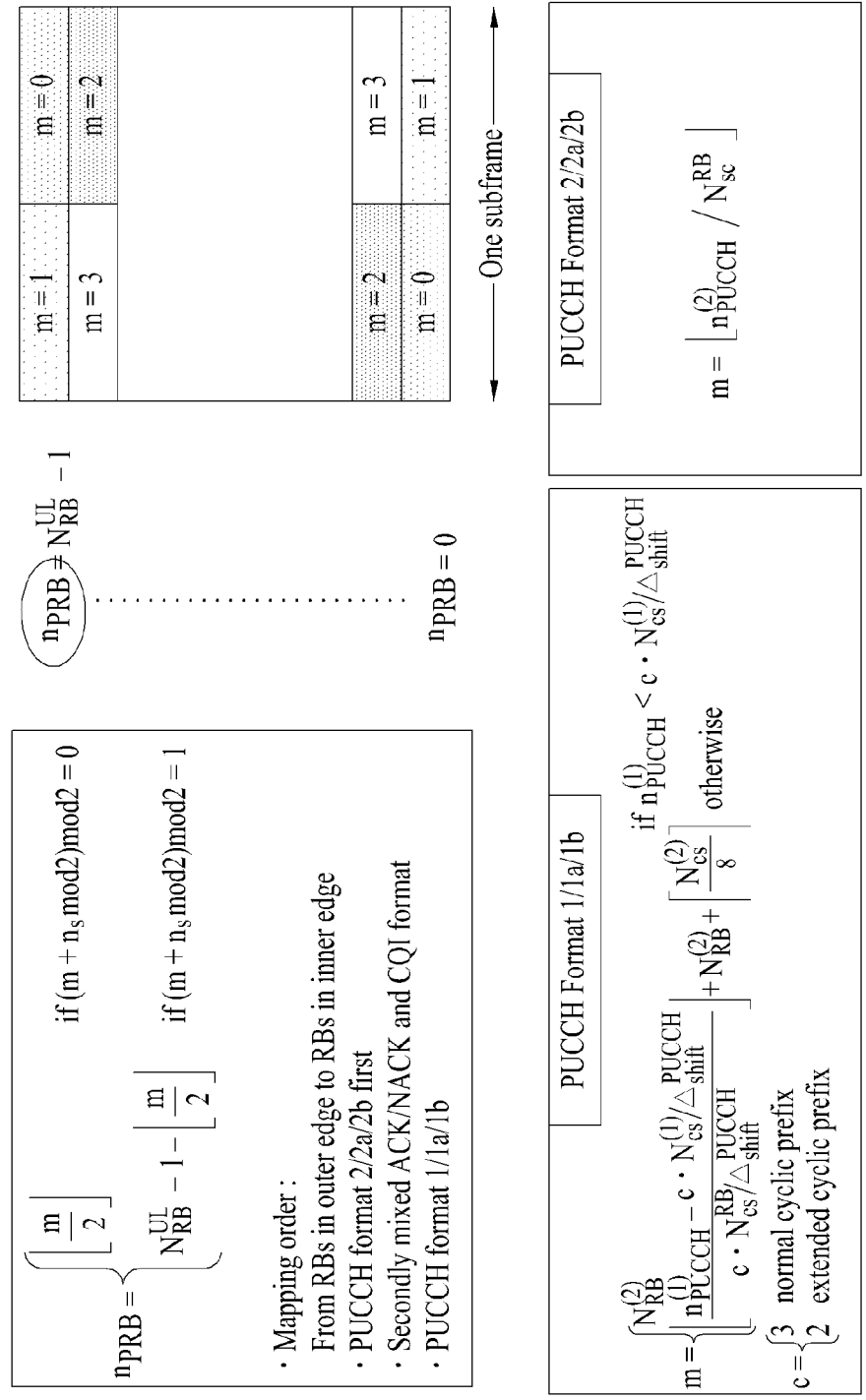
FIG. 19 illustrates PRB allocation.

FIG. 19 illustrates PRB allocation. As illustrated in FIG. 19, PRBs may be used for PUCCH transmission in slot $n_s$.

A multi-carrier system or Carrier Aggregation (CA) system aggregates a plurality of carriers having narrower bandwidths than a target bandwidth, for wideband support. To ensure backward compatibility with a legacy system, the bandwidths of the plurality of carriers may be restricted to bandwidths used in the legacy system. For example, the legacy LTE system supports 1.4, 3, 5, 10, 15, and 20 MHz and the LTE-A system evolved from the LTE system may support a broader bandwidth than 20 MHz by aggregating LTE bandwidths. Alternatively, a new bandwidth may be defined irrespective of the legacy bandwidths to thereby support CA. The term multi-carrier is interchangeable with CA and bandwidth aggregation. CA may cover both aggregation of contiguous carriers and aggregation of non-contiguous carriers. In addition, CA may cover both intra-band CA and inter-band CA.

Figure 20:
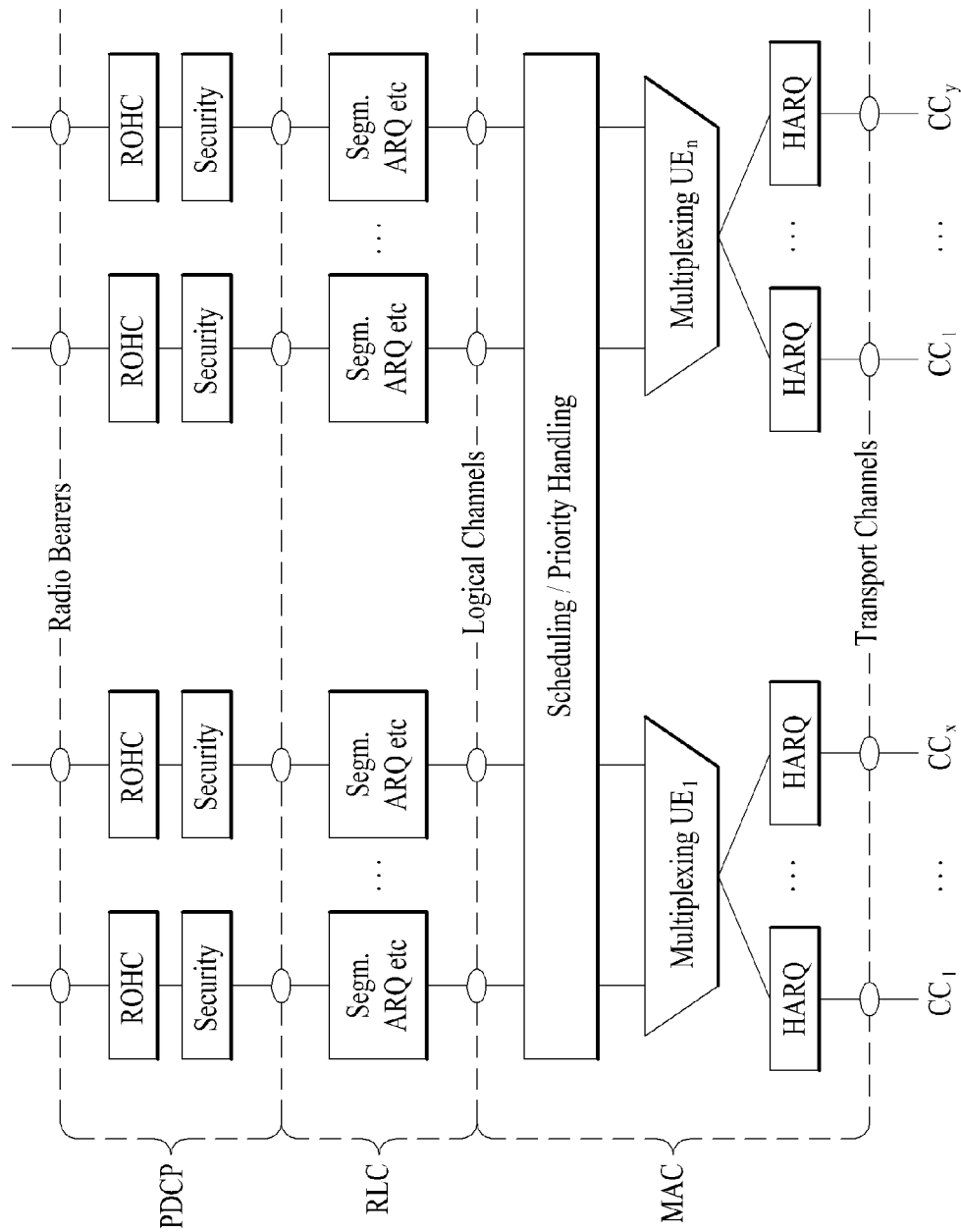
FIG. 20 illustrates a concept of managing DownLink Component Carriers (DL CCs) at an eNB.
Figure 21:
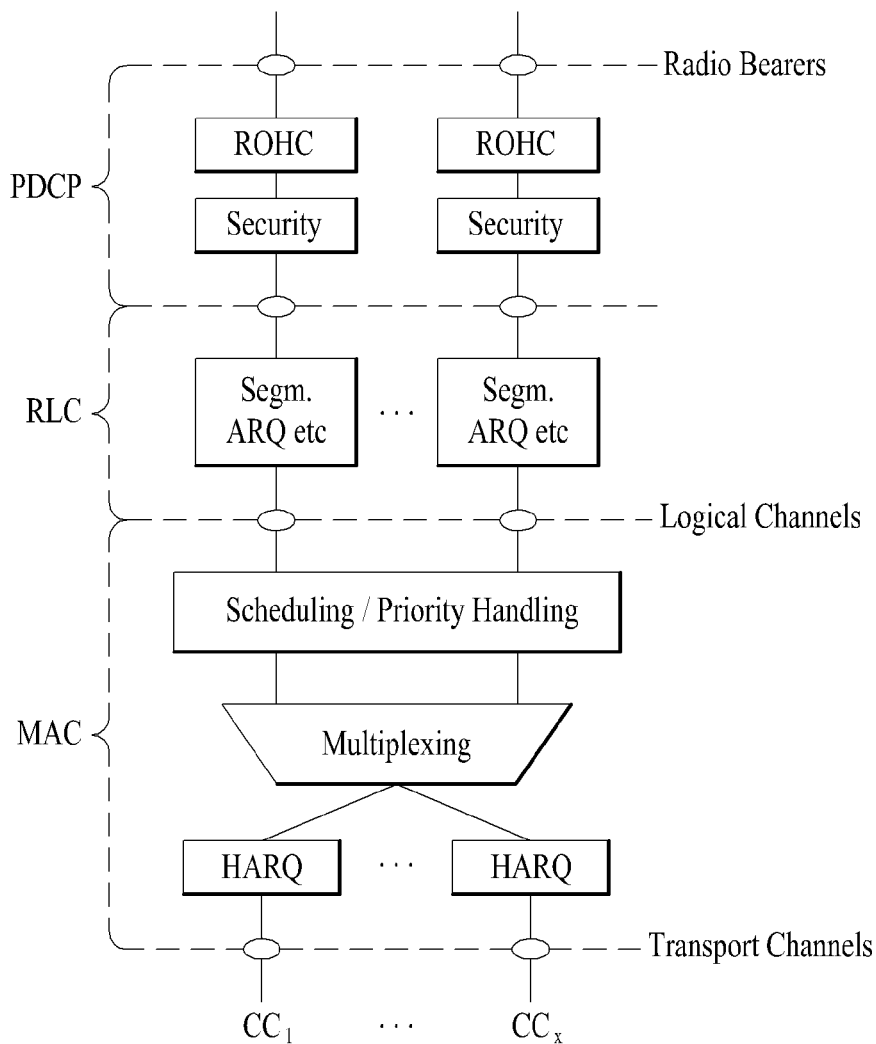
FIG. 21 illustrates a concept of managing UpLink Component Carriers (UL CCs) at a UE.

FIG. 20 illustrates a concept of managing DownLink Component Carriers (DL CCs) at an eNB and FIG. 21 illustrates a concept of managing UpLink Component Carriers (UL CCs) at a UE. For the convenience of description, a MAC layer is taken simply as a higher layer in FIGS. 19 and 20.

Figure 22:
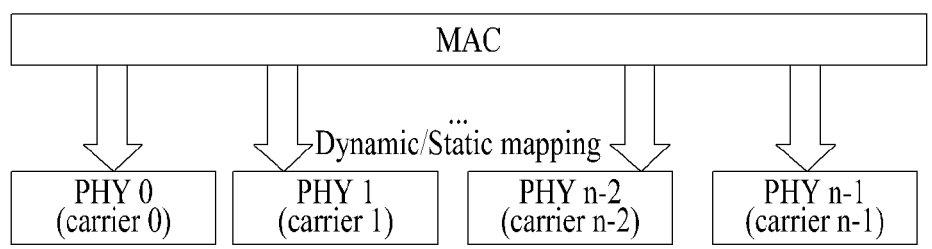
FIG. 22 illustrates a concept of managing multiple carriers using one Medium Access Control (MAC) entity at an eNB.
Figure 23:
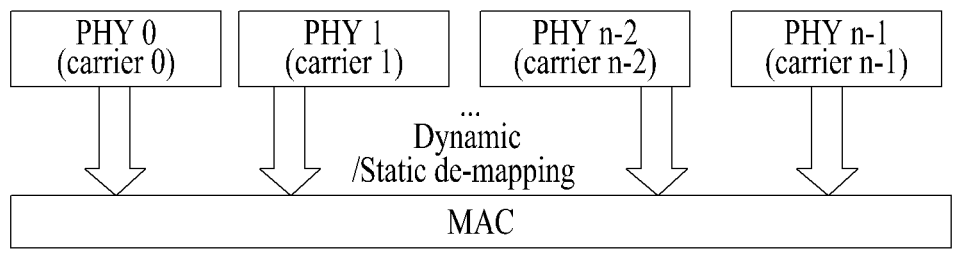
FIG. 23 illustrates a concept of managing multiple carriers using one MAC entity at a UE.

FIG. 22 illustrates a concept of managing multiple carriers using one MAC entity at an eNB and FIG. 23 illustrates a concept of managing multiple carriers using one MAC entity at a UE.

Referring to FIGS. 22 and 23, a single MAC entity manages and operates one or more frequency carriers, for transmission and reception. Because the frequency carriers managed by the single MAC entity do not need to be contiguous, resource management is more flexible. In FIGS. 22 and 23, one Physical (PHY) entity means one CC, for the convenience of description. One PHY entity does not necessarily refer to an independent Radio Frequency (RF) device. Although one independent RF device generally means one PHY entity, this is not always true. Thus one RF device may include a plurality of PHY entities.

Figure 24:
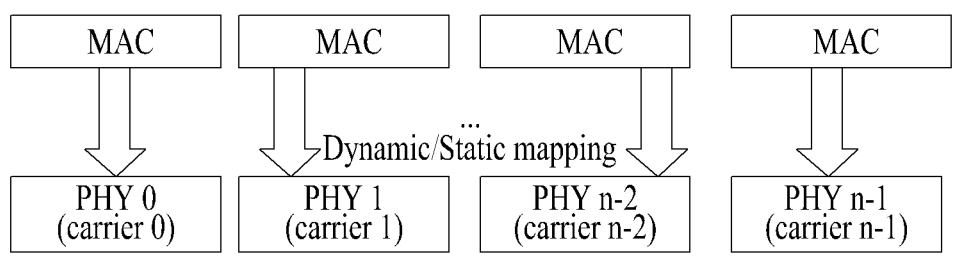
FIG. 24 illustrates a concept of managing multiple carriers using a plurality of MAC entities at an eNB.
Figure 25:
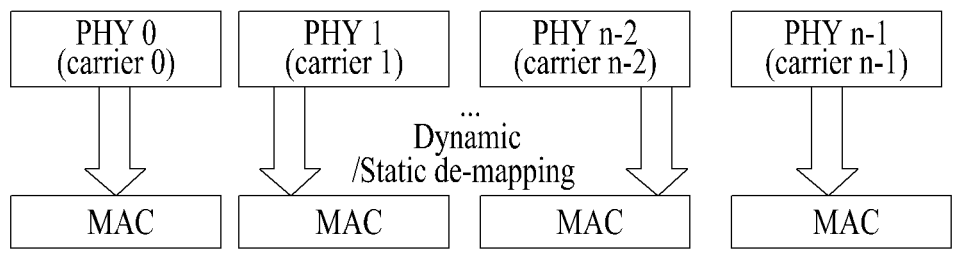
FIG. 25 illustrates a concept of managing multiple carriers using a plurality of MAC entities at a UE.
Figure 26:
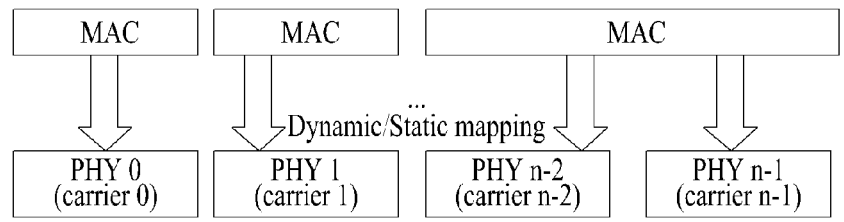
FIG. 26 illustrates another concept of managing multiple carriers using a plurality of MAC entities at an eNB.
Figure 27:
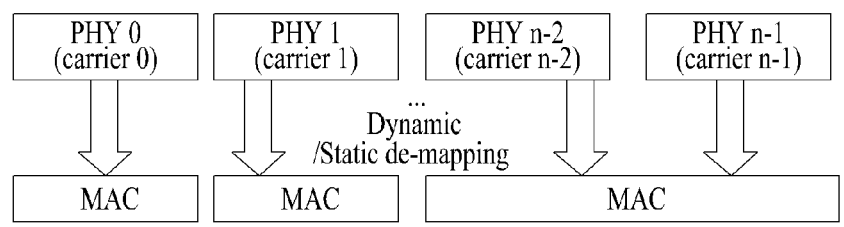
FIG. 27 illustrates another concept of managing multiple carriers using a plurality of MAC entities at a UE.

FIG. 24 illustrates a concept of managing multiple carriers using a plurality of MAC entities at an eNB, FIG. 25 illustrates a concept of managing multiple carriers using a plurality of MAC entities at a UE, FIG. 26 illustrates another concept of managing multiple carriers using a plurality of MAC entities at an eNB, and FIG. 27 illustrates another concept of managing multiple carriers using a plurality of MAC entities at a UE.

As compared to the structures illustrated in FIGS. 22 and 23, a plurality of MAC entities may control a plurality of carriers as illustrated in FIGS. 24 to 27.

The MAC entities may control the carriers at a one-to-one correspondence as illustrated in FIGS. 24 and 25, whereas a plurality of MAC entities may control some of the plurality of carriers in a one-to-one correspondence and one MAC entity may control the remaining one or more carriers as illustrated in FIGS. 26 and 27.

The above system has N carriers which may be used contiguously or non-contiguously. This applies to UL and DL. A TDD system is designed so as to use N carriers each for DL and UL transmission, while an FDD system is designed so as to use a plurality of carriers separately for DL and UL transmissions. The FDD system may support asymmetrical CA in which the number of aggregated carriers and/or a carrier bandwidth is different for DL and UL.

If the same number of CCs are aggregated for UL and DL, all CCs may be configured to ensure backward compatibility with a legacy system. However, CCs that do not ensure backward compatibility are not excluded from the present invention.

Figure 28:
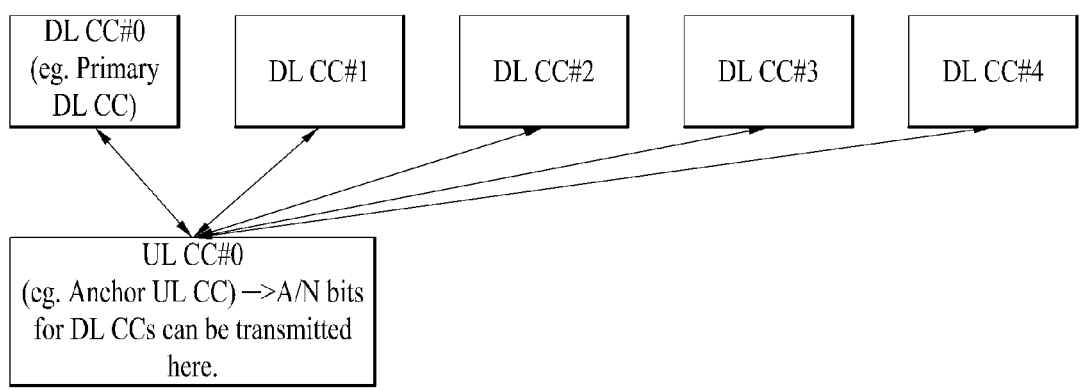
FIG. 28 illustrates asymmetrical Carrier Aggregation (CA) with five DL CCs linked to one UL CC.

FIG. 28 illustrates asymmetrical CA with five DL CCs linked to one UL CC. The asymmetrical CA may be configured from the viewpoint of UCI transmission. UCI related to a plurality of DL CCs (e.g. ACKs/NACKs related to the DL CCs) is transmitted in one UL CC. Even though a plurality of UL CCs are configured, specific UCI (e.g. an ACK/NACK related to a DL CC) is transmitted in a predetermined one UL CC (e.g. a Primary CC (PCC) or Primary Cell (PCell)). If each DL CC may deliver up to two codewords and the number of ACKs/NACKs for each CC depends on the maximum number of codewords set for the CC (e.g. if an eNB sets 2 as the maximum number of codewords for a specific CC, even though a specific PDCCH uses only one codeword in the CC, a related ACK/NACK has as many codewords as the maximum number of codewords set for the CC, that is, two codewords), a UL ACK/NACK needs at least two bits per DL CC. In this case, at least 10 ACK/NACK bits are required to transmit ACKs/NACKs for data received in five DL CCs, in one UL CC. To further distinguish the DTX state for each DL CC, at least 12 bits ($=5^6=3125=11.61$ bits) are required for ACK/NACK transmission. Since the existing PUCCH formats 1a and 1b allow transmission of only up to two ACK/NACK bits, these structures are not viable in transmitting the increased amount of ACK/NACK information. While CA is given herein as an exemplary cause of increasing the amount of UCI, the amount of UCI may also be increased due to an increase in the number of antennas, a TDD system, the presence of a backhaul subframe in a relay system, etc. When other control information related to a plurality of DL CCs is to be transmitted in one UL CC, the amount of the control information is increased like ACK/NACK information. For example, when CQIs/PMIs/RIs for a plurality of DL CCs are to be transmitted, UCI payload may be increased. While ACK/NACK information for a codeword is taken as an example in the present invention, it is to be clearly understood that a transport block corresponding to the codeword exists and the ACK/NACK information may apply as an ACK/NACK for the transport block.

In FIG. 28, a UL anchor CC (i.e. a UL PCC) is a CC in which a PUCCH or UCI is transmitted. The UL anchor CC may be determined cell-specifically or UE-specifically. For example, a UE may determine a CC in which the UE attempts initial random access as a PCC. A DTX state may be fed back explicitly or may be fed back as the same state as a NACK.

In LTE-A, the concept of cell is adopted to manage radio resources. A cell is defined as a combination of DL and UL resources, while the UL resources are optional. Accordingly, a cell may include DL resources only or both DL and UL resources. If CA is supported, the linkage between the carrier frequencies (or DL CCs) of DL resources and the carrier frequencies (or UL CCs) of UL resources may be indicated by system information. A cell operating in a primary frequency resource (or a PCC) may be referred to as a PCell and a cell operating in a secondary frequency resource (an SCC) may be referred to as an SCell. The PCell is used for a UE to establish an initial connection or to re-establish a connection. The PCell may be a cell indicated during handover. Only one PCell may exist in CA in LTE-A release 10. The SCell may be configured after an RRC connection is established and used to provide additional radio resources. Both a PCell and an SCell may be collectively referred to as serving cells. Accordingly, if CA has not been configured for a UE in RRC_CONNECTED state or the UE in RRC_CONNECTED state does not support CA, one serving cell including only a PCell exists for the UE. On the other hand, if CA has been configured for a UE in RRC_CONNECTED state, one or more serving cells including a PCell and one or more SCells exist for the UE. For CA, a network may add one or more SCells to a PCell initially configured during connection establishment, for a UE after initial security activation is initiated. Therefore, the terms PCC, PCell, primary (radio) resource, and primary frequency resource are interchangeably used. Likewise, the terms SCC, SCell, secondary (radio) resource, and secondary frequency resource are interchangeably used.

Now, a method for efficiently transmitting an increased amount of UCI will be described. Specifically, a new PUCCH format/a signal processing operation/a resource allocation method for transmitting an increased amount of UCI will be described. A new PUCCH format proposed by the present invention will be referred to as a CA PUCCH format or PUCCH format 3, considering that PUCCH format 1 to PUCCH format 2 are defined in the legacy LTE release 8/9. The technical spirit of the proposed PUCCH format may be readily applied to any physical channel carrying UCI (e.g. a PUSCH) in the same manner or in a similar manner. For example, embodiments of the present invention are applicable to a periodic PUSCH structure that delivers control information periodically or an aperiodic PUSCH structure that delivers control information aperiodically.

The following description focuses on a subframe-level/slot-level UCI/RS symbol structure applied to PUCCH format 3, which uses a legacy LTE UCI/RS symbol structure of PUCCH format 1/1a/1b (a normal CP case). However, the subframe-level/slot-level UCI/RS symbol structure of PUCCH format 3 is purely exemplary and thus the present invention is not limited to the specific structure. The number and positions of UCI/RS symbols in PUCCH format 3 of the present invention may be changed freely according to a system design. For example, PUCCH format 3 may be defined based on a legacy LTE RS symbol structure of PUCCH format 2/2a/2b according to an embodiment of the present invention.

In an embodiment of the present invention, PUCCH format 3 may be used to transmit UCI of any type/size. For example, information such as an HARQ ACK/NACK, a CQI, a PMI, an RI, an SR, etc. may be transmitted in PUCCH format 3 and the information may have payload of any size in the embodiment of the present invention. For the convenience of description, mainly ACK/NACK transmission in PUCCH format 3 of the present invention will be described below.

FIGS. 29 to 32 illustrate exemplary structures of PUCCH format 3 and signal processing operations based on the PUCCH format 3 structures according to the present invention. Particularly, FIGS. 29 to 32 illustrate exemplary DFT-based PUCCH format structures. In a DFT-based PUCCH structure, a PUCCH is DFT-precoded, spread with a time-domain OC at an SC-FDMA level, and then transmitted. Hereinbelow, DFT-based PUCCH formats are collectively referred to as PUCCH format 3.

Figure 29:
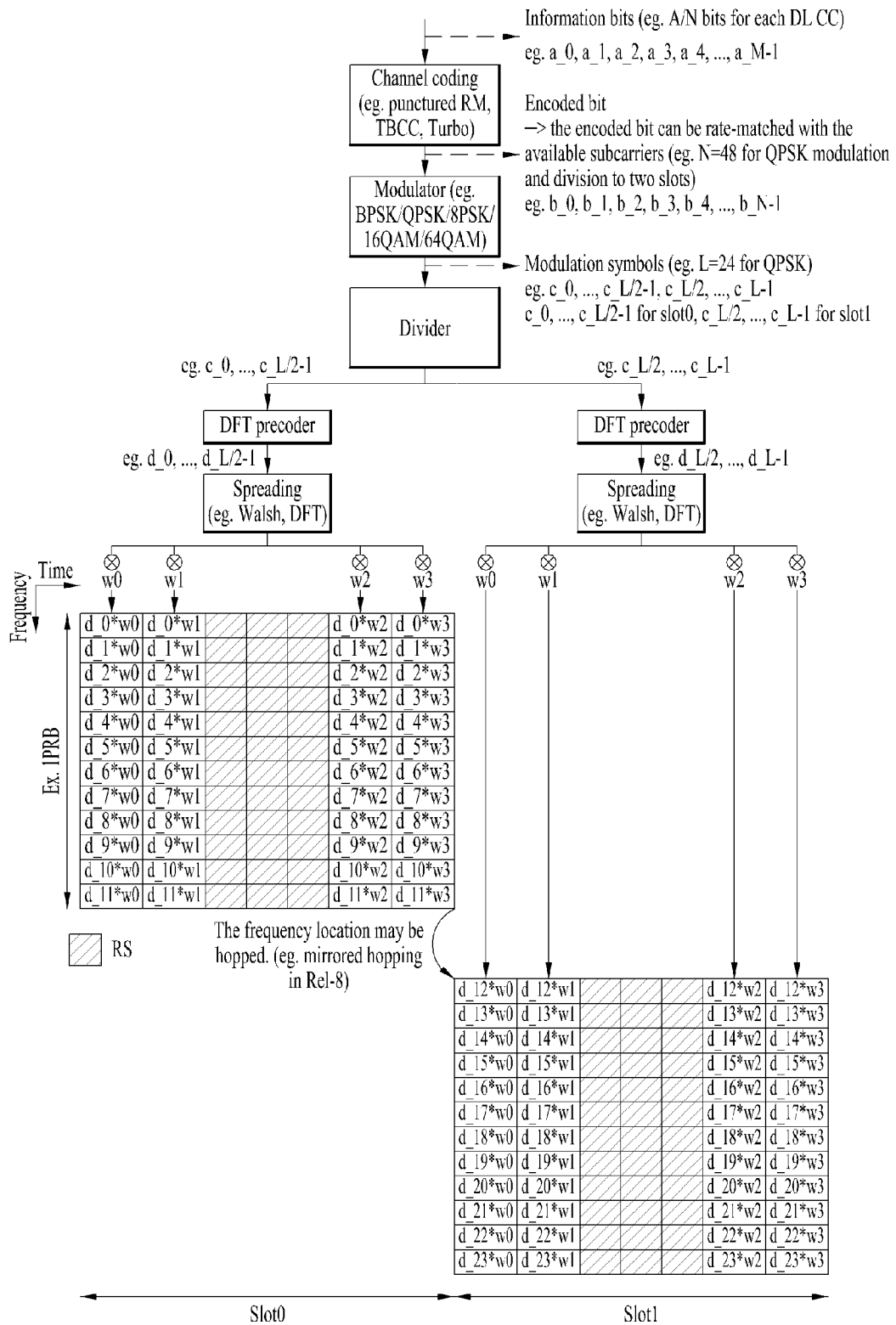
FIGS. 29 to 32 illustrate a structure of PUCCH format 3 and a signal processing operation for PUCCH format 3, to which the present invention is applied.

FIG. 29 illustrates a structure of PUCCH format 3 using an OC with a Spreading Factor (SF) of 4. Referring to FIG. 29, a channel coding block channel-encodes transmission bits $a\_0, a\_1, \ldots, a\_M-1$ (e.g. multiple ACK/NACK bits) to coded bits (encoded bits or coding bits) (or a codeword) $b\_0, b\_1, b\_N-1$. M is the length of the transmission bits and N is the length of the coded bits. The transmission bits include UCI, for example, multiple ACKs/NACKs for data received on a plurality of PDSCHs in a plurality of DL CCs. The transmission bits $a\_0, a\_1, \ldots, a\_M-1$ are jointly encoded irrespective of the type/number/size of UCI. For example, if the transmission bits include ACKs/NACKs for a plurality of DL CCs, the transmission bits are wholly encoded, rather than they are encoded on a DL CC basis and on an ACK/NACK bit basis. As a result, a single codeword is produced. The channel coding includes, not limited to, simple repetition, simplex coding, RM coding, punctured RM coding, Tail-Biting Convolutional Coding (TBCC), Low-Density Parity-Check (LDPC) coding, or Turbo coding. While not shown, the coded bits may be rate-matched in consideration of a modulation order and the amount of resources. The rate matching function may be incorporated into the channel coding block or may be performed in a separate functional block. For example, the channel coding block may generate a single codeword by encoding a plurality of pieces of control information using a (32, 0) RM code and may perform cyclic buffer rate-matching on the codeword.

A modulator generates modulation symbols $c\_0, c\_1, \ldots, c\_L-1$ by modulating the coded bits $b\_0, b\_1, \ldots, b\_N-1$. L is the size of modulation symbols. The coded bits $b\_0, b\_1, \ldots, b\_N-1$ are modulated by changing the size and phase of the transmission signal. For example, n-Phase Shift Keying (n-PSK) or n-QAM may be used as a modulation scheme (n is an integer equal to or larger than 2). Specifically, the modulation scheme may be BPSK, QPSK, 8-PSK, QAM, 16-QAM, 64-QAM, etc.

A divider divides the modulation symbols $c\_0, c\_1, \ldots, c\_L-1$ to each slot. The sequence/pattern/method of dividing the modulation symbols to each slot is not limited to a specific sequence/pattern/method. For example, the divider may divide the modulation symbols to each slot sequentially, starting from the first modulation symbol (localized scheme). In this case, the modulation symbols $c\_0, c\_1, \ldots, c\_L/2-1$ may be divided to slot 0 and the modulation symbols $c\_L/2, c\_L/2+1, \ldots, c\_L-1$ may be divided to slot 1. When the modulation symbols are divided, the modulation symbols may be interleaved (or permuted). For example, even-numbered modulation symbols may be divided to slot 0, while odd-numbered modulation symbols may be divided to slot 1. The order of the modulation and the division operations may be changed.

DFT precoders perform DFT precoding (e.g. 12-point DFT) on the modulation symbols divided to the respective slots in order to generate a single carrier waveform. Referring to FIG. 19, the modulation symbols $c\_0, c\_1, \ldots, c\_L/2-1$ divided to slot 0 are DFT-precoded to DFT symbols $d\_0, d\_1, \ldots, d\_L/2-1$ and the modulation symbols $c\_L/2, c\_L/2+1, \ldots, c\_L-1$ divided to slot 1 are DFT-precoded to DFT symbols $d\_L/2, d\_L/2+1, \ldots, d\_L-1$. The DFT precoding may be replaced with another equivalent linear operation (e.g. Walsh precoding).

Spreading blocks spread the DFT signals at an SC-FDMA symbol level (in the time domain). The SC-FDMA symbol-level time-domain spreading is performed using a spreading code (sequence). The spreading code includes a quasi-OC and an OC. The quasi-OC includes, not limited to, a Pseudo-Noise (PN) code. The OC includes, not limited to, a Walsh code and a DFT code. While an OC is taken as an exemplary spreading code for the convenience of description, the OC may be replaced with a quasi-OC. The maximum size of a spreading code (or a maximum SF) is limited by the number of SC-FDMA symbols in which control information is transmitted. For example, if control information is transmitted in four SC-FDMA symbols in one slot, a length-4 OC w0, w1, w2, w3 may be used in each slot. The SF means the spreading degree of control information. The SF may be related to a multiplexing order or antenna multiplexing order of a UE. The SF may be changed to, for example, 1, 2, 3, 4, . . . depending on system requirements. An SF may be predefined between an eNB and a UE or indicated to the UE by DCI or RRC signaling.

For example, if one of SC-FDMA symbols configured to deliver control information is punctured for SRS transmission in a slot, a spreading code with a decreased SF (e.g. SF=3 instead of SF=4) may be used for control information in the slot.

A signal generated in the above operation is mapped to subcarriers of a PRB and converted to a time-domain signal by IFFT. A CP is added to the time-domain signal and the resulting SC-FDMA symbols are transmitted through an RF end.

Each step will be described in greater detail on the assumption that ACKs/NACKs for five DL CCs are transmitted. If each DL CC may carry two PDSCHs, an ACK/NACK for the DL CC may be 12 bits, with a DTX state included. If QPSK modulation and time spreading with an SF of 4 are performed, a (rate-matched) coding block may be 48 bits. The coded bits are modulated to 24 QPSK modulation symbols which are divided to two slots, 12 QPSK symbols to each slot. The QPSK symbols of each slot are converted to 12 DFT symbols by 12-point DFT. The 12 DFT symbols of each slot are spread to four SC-FDMA symbols using a spreading code with an SF of 4 in the time domain and then mapped. Since 12 bits are transmitted in [2 bits×12 subcarriers×8 SC-FDMA symbols], the coding rate is 0.0625 (=12/192). If SF=4, up to four UEs may be multiplexed in each PRB.

Figure 30:
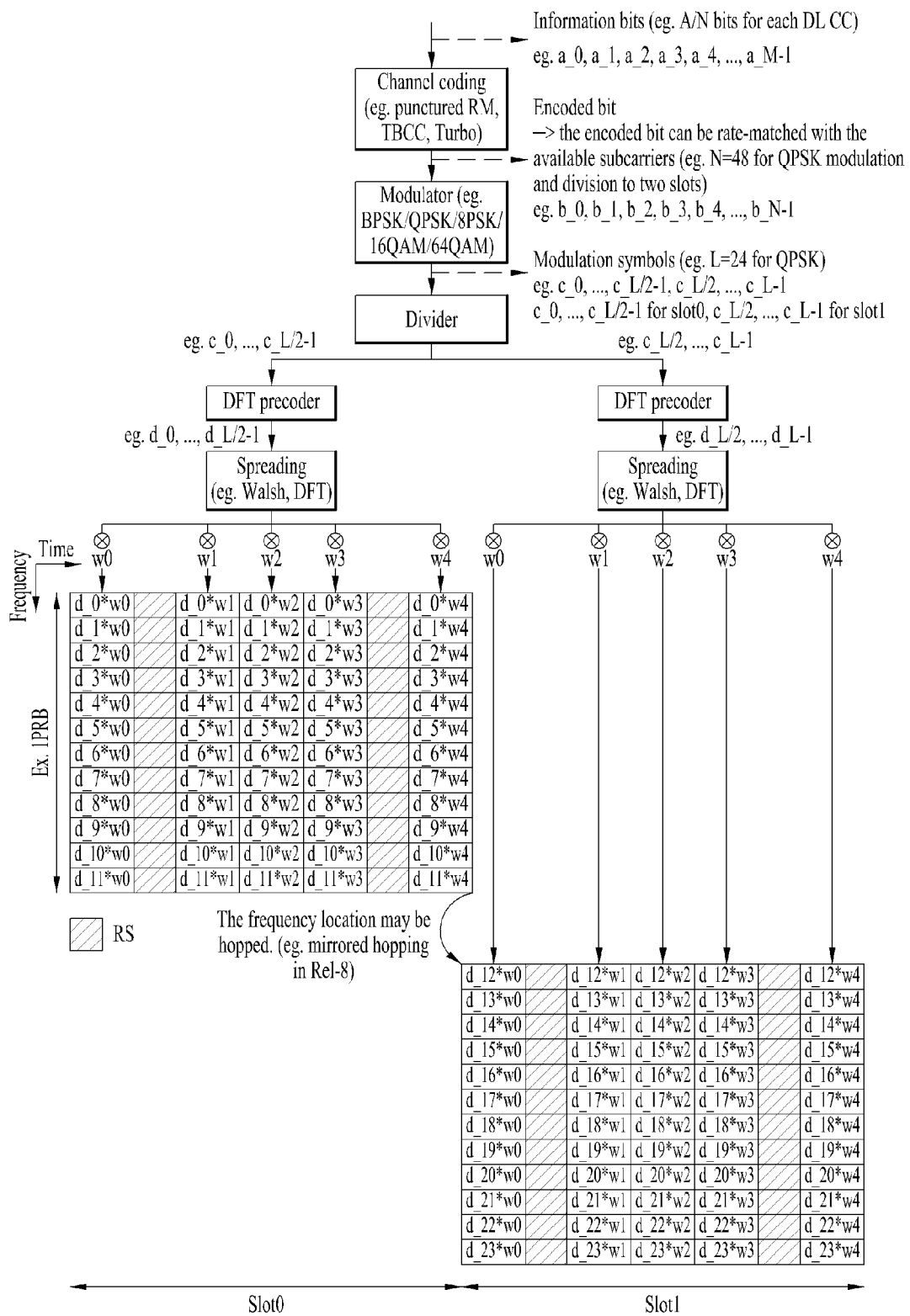

FIG. 30 illustrates an exemplary structure of PUCCH format 3 using an OC with an SF of 5.

The signal processing operation of FIG. 30 is basically identical to the signal processing operation described above with reference to FIG. 29, except for different numbers and positions of UCI SC-FDMA symbols and RS SC-FDMA symbols. Spreading blocks may reside at the front ends of DFT precoders.

In FIG. 30, an LTE RS structure may still be used. For example, a base sequence may be cyclically shifted. Because SF=5, the multiplexing capacity of a data part is 5. However, the multiplexing capacity of an RS part is determined by a CS interval $\Delta_{shift}^{PUCCH}$. For example, the multiplexing capacity of an RS part is given as $12/\Delta_{shift}^{PUCCH}$. If $\Delta_{shift}^{PUCCH}=1$, $\Delta_{shift}^{PUCCH}=2$, and $\Delta_{shift}^{PUCCH}=3$, the multiplexing capacities of an RS part are 12, 6, and 4, respectively. In FIG. 30, while the multiplexing capacity of the data part is 5 because SF=5, the multiplexing capacity of the RS part is 4 for $\Delta_{shift}^{PUCCH}$. Therefore, a total multiplexing capacity is the smaller between the multiplexing capacities of the data part and the RS part, that is, 4.

Figure 31:
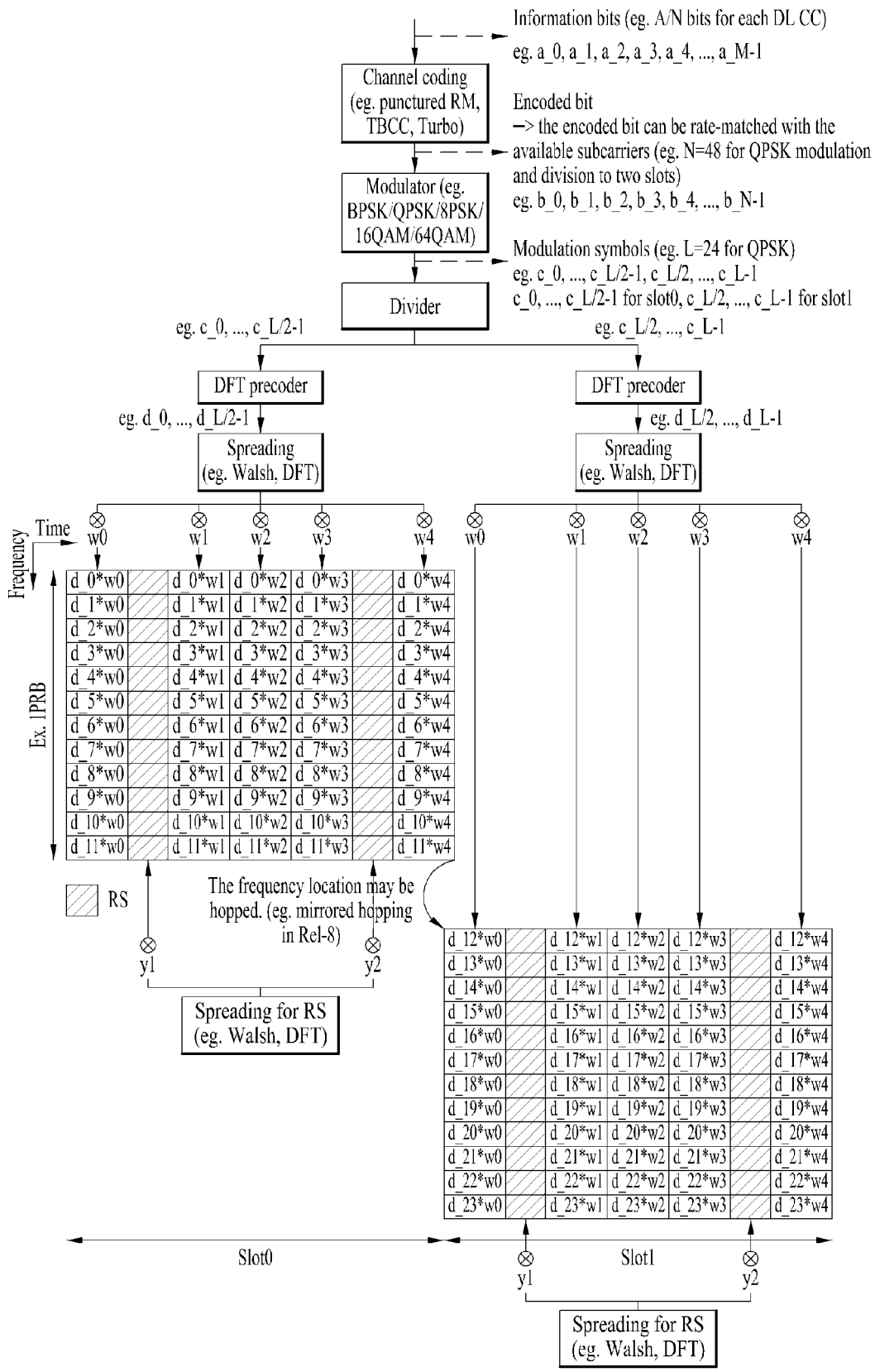

FIG. 31 illustrates an exemplary structure of PUCCH format 3, which may increase a slot-level multiplexing capacity.

The total multiplexing capacity may be increased by applying the SC-FDMA symbol-level spreading described before with reference to FIGS. 29 and 30 to RSs. Referring to FIG. 31, the use of a Walsh cover (or a DFT code cover) in a slot doubles the multiplexing capacity. Therefore, the multiplexing capacity is 8 for $\Delta_{shift}^{PUCCH}$, thereby not decreasing the multiplexing capacity of the data part. While [y1 y2]=[1 1] or [y1 y2]=[1 –1] in FIG. 31, linear modifications of [y1 y2] (e.g. [j j], [j –j], [1 j], [1 –j], etc.) are also available as RS OCCs.

Figure 32:
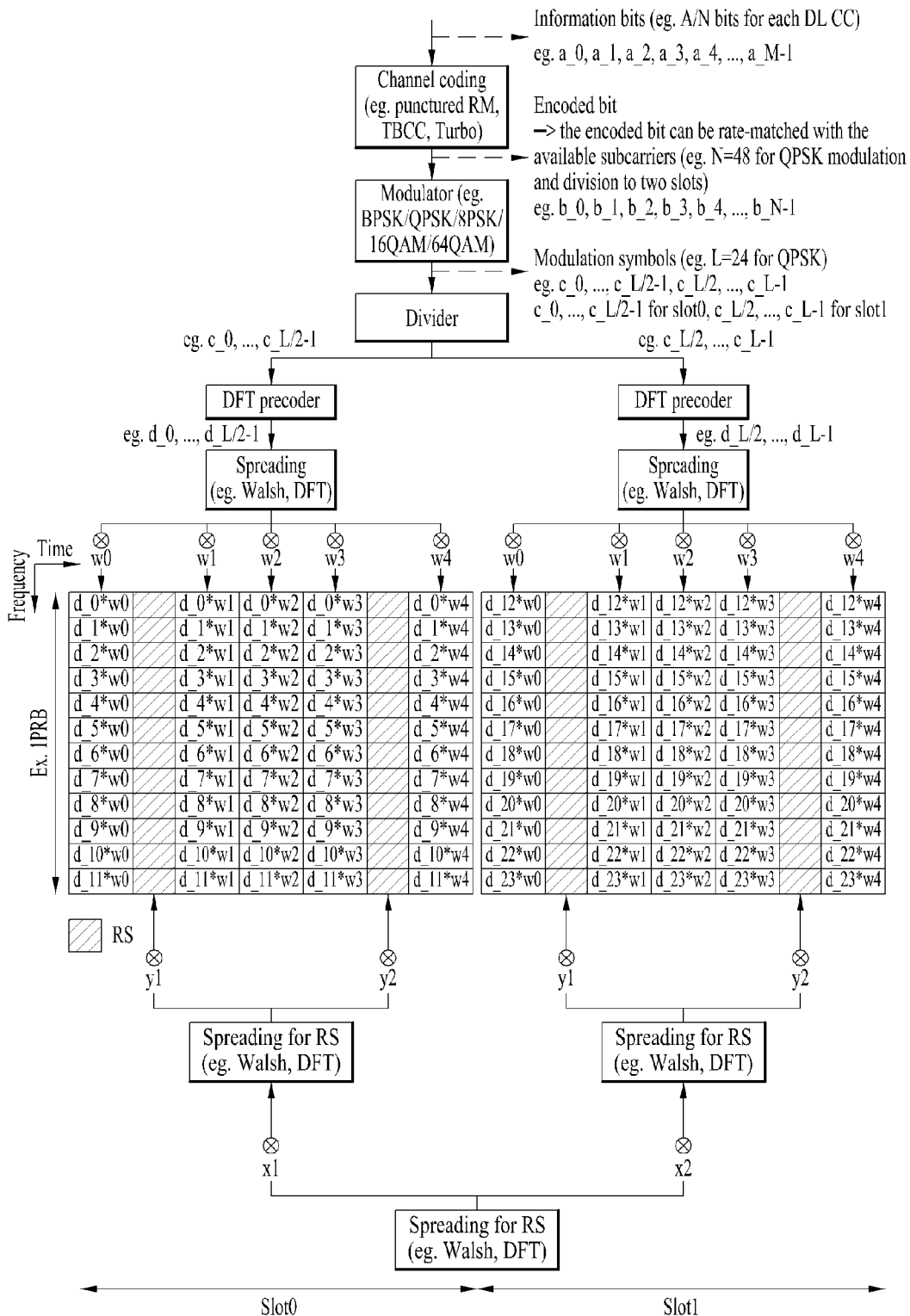

FIG. 32 illustrates an exemplary structure of PUCCH format 3, which may increase a subframe-level multiplexing capacity.

Without slot-level frequency hopping, the use of a Walsh cover on a slot basis may double the multiplexing capacity. As stated before, [x1 x2]=[1 1] or [1–1] may be used as an OCC and its linear modifications are also available as RS OCCs.

An operation for processing PUCCH format 3 is not restricted to operation orders illustrated in FIGS. 29 to 32.

Cross carrier scheduling is to schedule a data channel transmitted in a PCC or another CC by a control channel transmitted in the PCC using a CIF.

Figure 33:
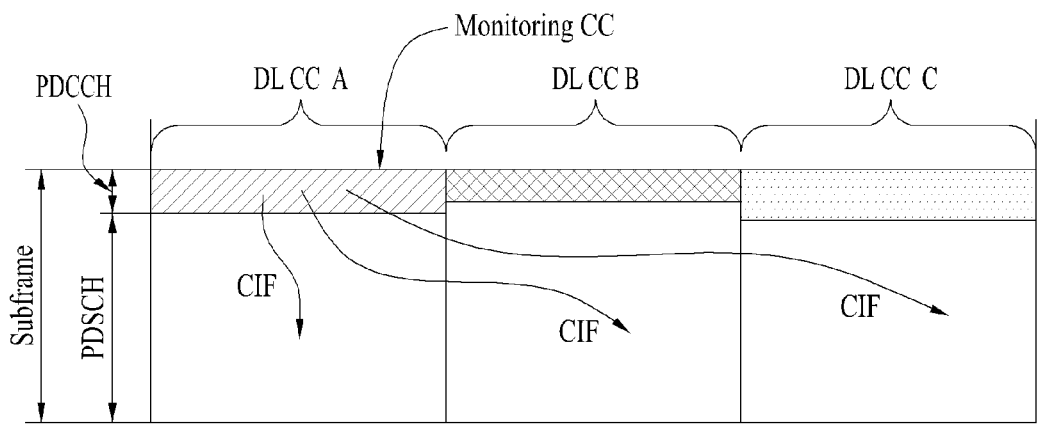
FIG. 33 illustrates an exemplary application of cross carrier scheduling.

FIG. 33 illustrates an exemplary application of cross carrier scheduling. Particularly, FIG. 33 illustrates a cross carrier scheduling scheme using a CIF, in the case where three cells (or CCs) are allocated to a Relay Node (RN). It is assumed herein that DL Cell (DL CC) #A is a PCell and the other CCs #B and #C are SCells.

The present invention proposes a method for efficiently conducting UL communication of a UE in a CA situation where the UE transmits and receives data in two or more frequency spectrums, frequency bands, or carriers.

For the convenience of description, it is assumed that the UE is configured to communicate in two CCs.

One of the CCs is called a PCC or PCell and the other CC is called an SCC or SCell.

It is also assumed that the UE receives various control signals such as a PDCCH in the PCell and data transmission and reception in the SCell is cross-carrier scheduled by a control signal in the PCell.

For the convenience of description, the proposed methods will be described in the context of an FDD system in which CC #1 is a DL PCell (LTE-A frequency band), CC #3 is a UL PCell (LTE-A frequency band), and CC #2 is an SCell (unlicensed band).

Figure 34:
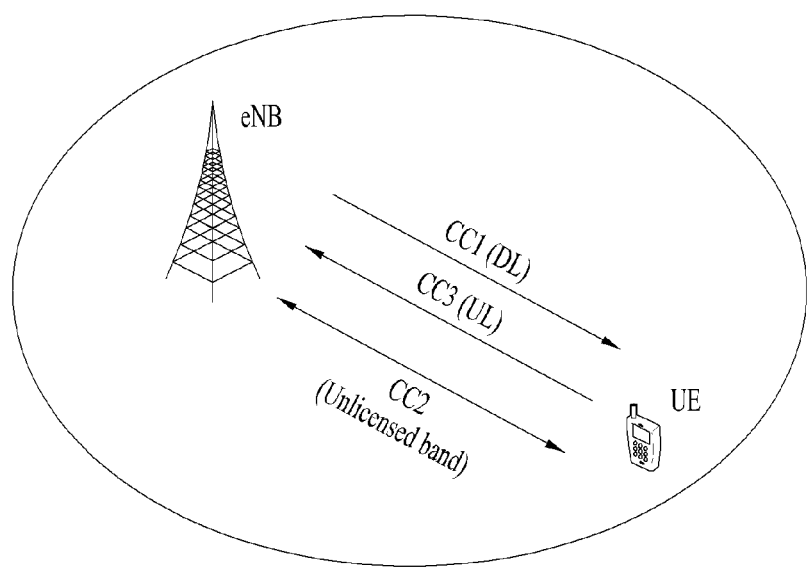
FIG. 34 illustrates an exemplary configuration of a Frequency Division Duplexing (FDD) system according to the present invention.

FIG. 34 is a simplified diagram illustrating the FDD system. Referring to FIG. 34, DL/UL scheduling information is transmitted in CC #1 as the DL PCell. A UL ACK/NACK and CSI (e.g. a CQI, an RI, etc.) are transmitted in CC #3 as the UL PCell. However, the proposed methods of the present invention may be extended to a case where CC #2 (e.g. an SCell and an unlicensed band) is aggregated in a TDD system where a DL PCell and a UL PCell operate in the same band.

Referring to FIG. 34, if an eNB schedules a UL SubFrame (SF) of CC #2 (e.g. an SCell) for a UE by cross carrier scheduling in CC #1 (e.g. a DL PCell), the eNB and the UE are not allowed to use CC #2 exclusively. Rather, the eNB and the UE should use CC #2 by contention with other systems based on Carrier Sensing (CS). Therefore, the eNB may not make clear "the starting/ending time of PUSCH transmission in CC #2" or "whether PUSCH transmission is available or not" for the UE.

The same problem occurs when CC #2 (e.g. an SCell) is aggregated in a TDD system where a DL PCell and a UL PCell operate in the same frequency band.

Accordingly, the present invention proposes a method for transmitting information indicating "whether PUSCH transmission is available in an SCell" and information about "the starting/ending time of PUSCH transmission" using UL resources of a PCell for which a transmission opportunity is ensured for a UE all the time or at a preset time point.

One thing to note herein is that the information transmitted in the UL resources of the PCell is not limited to the information indicating "whether PUSCH transmission is available in an SCell" and the information about "the starting/ending time of PUSCH transmission" and may further include various pieces of information related to SCell-based PUSCH transmission.

For the convenience of description, it is assumed that a UL subframe of CC #2 (e.g. an SCell) is scheduled by cross carrier scheduling in CC #1 (e.g. a DL PCell).

However, the present invention is not limited to the assumption. It is obvious that the present invention is also applicable to aggregation of two or more CCs or non-cross carrier scheduling.

Specific methods of the present invention applicable to the assumed environment will first be described.

Case 1

It is first assumed that a UE has received a UL grant for a UL subframe of CC #2 in SF #n of CC #1.

The UE starts to perform a CS operation in 'the first slot' or 'the second slot' of SF #(n+k) (e.g. "k=4" or "an integer satisfying k≤3 or k≥5) to determine whether CC #2 is "idle" or "busy".

'The first slot' or 'the second slot' of SF #(n+k) in which the UE performs a CS operation may be used for transmission of "Carrier Reservation Transport Block (CRTB)".

For example, a maximum time period during which the UE performs the CS operation to determine the state of CC #2 may be set to $T_{max}$. If the UE determines that CC #2 is busy during the time period $T_{max}$, the UE may "repeat the CS operation on CC #2 in the next slot, discontinuing the CS operation on CC #2 in the corresponding slot" or may "give up PUSCH transmission in the corresponding SF". The eNB may indicate a value of $T_{max}$ and a CS rule to the UE by a higher-layer signal or a physical-layer signal.

A CRTB is a kind of "dummy information" or "a copy of a part of a later transmitted PUSCH", which the UE transmits to reserve CC #2 as its resources until before actual PUSCH transmission, if the UE determines by a CS operation that CC #2 is idle during a predetermined time period (e.g. a time period T).

For example, the eNB may determine according to a predefined rule what information a CRTB transmitted by a UE includes and/or whether the CRTB is transmitted from a UE communicating with the eNB.

The UE may transmit information to the eNB efficiently by including a UE Identifier (ID) of the UE or an indicator indicating whether a (current) transmitted signal serves as a CRTB.

As stated above, if the UE determines by a CS operation that CC #2 is idle for a predetermined time period (e.g. the time period T), the UE transmits a CRTB. For example, the starting time of CRTB transmission is ["the start of a specific slot of SF #(n+k) in which the UE starts the CS operation"+ T].

For example, the ending time of the CRTB transmission may be the slot boundary (or SF boundary) of a PCC (e.g. CC #1) closest to the starting time of the CRTB transmission. Herein, the length of a CRIB (e.g. L) spans from the starting time of the CRIB transmission to the ending time of the CRTB transmission.

Case 2

If a UE has received a UL grant for a UL subframe of CC #2 in SF #n of CC #1, an eNB may transmit to the UE an additional "activation message" that activates the UL grant.

The eNB may also transmit the activation message to the UE in a next SF (e.g. SF #(n+v) where v is an integer equal to or larger than 5) as well as in SF #(n+4).

The activation message may include information indicating the transmission time of a UL grant linked to the activation message (e.g. a predefined indicator serving the usage). For example, if a preamble is used as the activation message, the information may be mapped to or included in a corresponding preamble sequence.

The activation message is a "preamble sequence known" to both the eNB and the UE. The known preamble sequence may serve many other usages as well as the usage of an activation message that activates a UL grant received at a specific time point.

For example, the usage of the preamble sequence may be set to indication of a purpose that radio resources at a specific time point will serve, indication of a transmission time of a PUSCH (e.g. the position of a subframe or an OFDM symbol), or indication of a UL HARQ process ID linked to PUSCH transmission activated by the preamble sequence.

Upon receipt of the activation message, the UE performs a CS operation to determine whether CCE #2 is "idle" or "busy", in a "slot in which the activation message has been received" or a "(predetermined) next specific slot". If the CCE #2 is idle for a predetermined time period (e.g. the time period T), the UE transmits a PUSCH.

Embodiments of the present invention will be described based on Case 1 and Case 2. It is to be clearly understood that the present invention can be extended to situations other than Case 1 and Case 2.

Embodiment 1

When a UL subframe of CC #2 (e.g. an SCell) is scheduled by cross carrier scheduling in CCE #1 (e.g. a PCell), a UE transmits to an eNB information indicating "whether a PUSCH is transmitted in CC #2" and information about "the starting/ending time of PUSCH transmission" in the following manner.

In this embodiment of the present invention, PUSCH transmission may take place "in units of a multiple of (1/Y)× (Length of Slot) of CC #1 (e.g. a DL PCell)" (Y≥1 and Y is an integer).

For example, the eNB may transmit information about a value of Y to the UE by a higher-layer signal or a physical-layer signal.

For the convenience of description, information about the starting time of PUSCH transmission in CC #2 is defined as "L_information".

The starting time of PUSCH transmission will first be described in detail.

The UE may notify the eNB of information about the starting time of PUSCH transmission (e.g. L_information) in UL resources (e.g. a PUCCH or a PUSCH) of CC #3 (e.g. a UL PCell) linked (or allocated) for mapping the information.

The UE may transmit L_information to the eNB in PUCCH resources of CC #3 (e.g. the UL PCC) positioned at an (actual) starting time or point of PUSCH transmission" or "(predetermined) fixed specific PUCCH resources of CC #3 (e.g. the UL PCC) irrespective of the (actual) starting time or point of PUSCH transmission".

In another method, the PUCCH resources of CC #3 (e.g. the UL PCC) used for transmission of L_information may be "resources linked to a CCE of a PDCCH granting the PUSCH resources of CC #2 (e.g. resources linked to a lowest CCE index of the UL grant)". Thus, PUCCH resource waste may be reduced.

For example, L_information may be "1 bit". That is, if L_information (e.g. 1 bit) is '0', this may imply that no PUSCH transmission takes place in CC #2 of a corresponding slot (or a corresponding subframe). If L_information is '1', this may imply that PUSCH transmission takes place in CC #2, starting from the start of the corresponding slot (or the start of a next slot).

In another example, the L_information may be "2 bits". That is, if L_information (e.g. 2 bits) is '00', this may imply that no PUSCH transmission takes place in CC #2 of a corresponding slot. If L_information is '01', this may imply that PUSCH transmission starts in CC #2 at a point ¼×(Length of SF) apart from the start of an SF of the DL PCC (e.g. CC #1). If L_information is '10', this may imply that PUSCH transmission starts in CC #2 at a point ½×(Length of SF) (e.g. the start of the second slot) apart from the start of the SF of the DL PCC (e.g. CC #1). If L_information is '11', this may imply that PUSCH transmission starts in CC #2 at a point ¾× (Length of SF) apart from the start of the SF of the DL PCC (e.g. CC #1).

In another example, if the UE transmits L_information to the eNB in PUCCH resources of CC #3 (e.g. the UL PCC), a part of L_information, $Bit_{first}$ allocated to a first PUCCH resource of CC #3 (e.g. the UL PCC) and a part of L_information, $Bit_{second}$ allocated to a second PUCCH resource of CC #3 (e.g. the UL PCC) may be defined differently.

The first and second PUCCH resources may be respectively the first and second slot areas of PUCCH resources linked to one CCE index.

That is, it may be indicated simply whether a PUSCH is transmitted in the first slot in CC #2 by setting "$Bit_{first}$=1 bit", while a final start time of PUSCH transmission in a subframe including two slots may be indicated by setting "$Bit_{second}$=2 bits". In this manner, a more specific starting time of PUSCH transmission may be indicated.

Particularly when the UE reports to the eNB in CC #3 in real time whether a PUSCH can be transmitted in CC #2, this method is effective. For example, if the UE reports the starting time of PUSCH transmission to the eNB in CC #3 in the same subframe as a PUSCH of CC #2, the UE may just report to the eNB at a time corresponding to the first slot whether a PUSCH is transmitted in the first slot of CC #2. Thus, it is not impossible for the UE to report to the eNB whether a PUSCH is transmitted in the second slot, in other words, whether a PUSCH is finally transmitted in a corresponding subframe and the starting time of the PUSCH transmission. Therefore, the afore-described method may enable transmission of more accurate information by reducing the amount of information reported in the first slot.

If the UE is to additionally transmit L_information in the existing UL resources of CC #3 (e.g. the UL PCC) to the eNB, the UE may use a specific PUCCH format configured for this usage (e.g. PUCCH format 3 (in the LTE system)) in a restrictive manner. In another method, resources at a specific position, preset for this usage between the eNB and the UE may be used as UL resources of CC #3 (e.g. the UL PCC) to which L_information is mapped.

Additionally, a field serving this usage may be newly created in an existing PUCCH format, for transmission of L_information.

The UE may transmit information indicating "whether a PUSCH is transmitted in CC #2" to the eNB in similar methods to the above-described methods for transmitting L_information.

Now a detailed description will be given of the ending time of PUSCH transmission.

The ending time of PUSCH transmission in CC #2 from a UE may be set to "a time point apart from the starting time of PUSCH transmission by a preset PUSCH length $L\_{PUSCH}$ (e.g. a fixed length of PUSCH)" or "an SF boundary or slot boundary of CC #1 (e.g. the DL PCell) closest to the starting time of PUSCH transmission".

For the convenience of description, a method for setting the ending time of PUSCH transmission to an SF boundary of CC #1 (e.g. the DL PCell) closest to the starting time of PUSCH transmission will be called Case 3.

A method for setting the ending time of PUSCH transmission to a slot boundary of CC #1 (e.g. the DL PCell) closest to the starting time of PUSCH transmission will be called Case 4.

Accordingly, as the above-described rules are shared between the eNB and the UE, information about the ending time of PUSCH transmission in CC #2 may be determined implicitly.

In another method, the UE may additionally transmit information about the ending time of PUSCH transmission in CC #2 to the eNB in methods similar to the afore-described methods for transmitting L_information (e.g. a method for transmitting L_information in UL resources (e.g. a PUCCH or PUSCH) of the UL PCC).

While the above description focuses on using a PUCCH of a PCell matching the transmission timing of a PUSCH in an SCell for the convenience of description, the present invention is not limited thereto. Thus, a time point before or after the transmission timing of a PUSCH in an SCell, or a preset specific time point may be used in the present invention.

Embodiment 2

When a UL subframe of CC #2 (e.g. an SCell) is scheduled by cross carrier scheduling in CC #1 (e.g. a DL PCell), a UE performs a CS operation to determine the state of CC #2.

If the UE determines by the CS operation that CC #2 is kept busy for a long time, the UE may transmit at least one bit indicating this state (ST_information) in UL resources (e.g. a PUCCH or PUSCH) of, for example, CC #3 (e.g. a UL PCC) to the eNB.

If the UE is to additionally transmit ST_information in existing UL resources of CC #3 (e.g. the UL PCC), the UE may transmit ST_information in methods similar to the method for transmitting L_information (e.g. a method for transmitting L_information in UL resources (a PUCCH or PUSCH) of the UL PCC).

With reference to FIGS. 35 to 40, specific application examples of Case 1 to Case 4 and the first and second embodiments of the present invention will be described below.

Embodiments of the present invention illustrated in FIGS. 35 to 40 provide "various method for scheduling a UL subframe of CC #2 (e.g. an SCell) by cross carrier scheduling in CC #1 (e.g. a DL PCell)" as well as "the proposed operation methods". The principles of these methods are embraced as the proposed methods of the present invention.

While the above description focuses on using a PUCCH of a PCell matching the transmission timing of a PUSCH in an SCell for the convenience of description, the present invention is not limited thereto. Thus, a time point before or after the transmission timing of the PUSCH in the SCell, or a preset specific time point may be used in the present invention.

Embodiment 3

Figure 35:
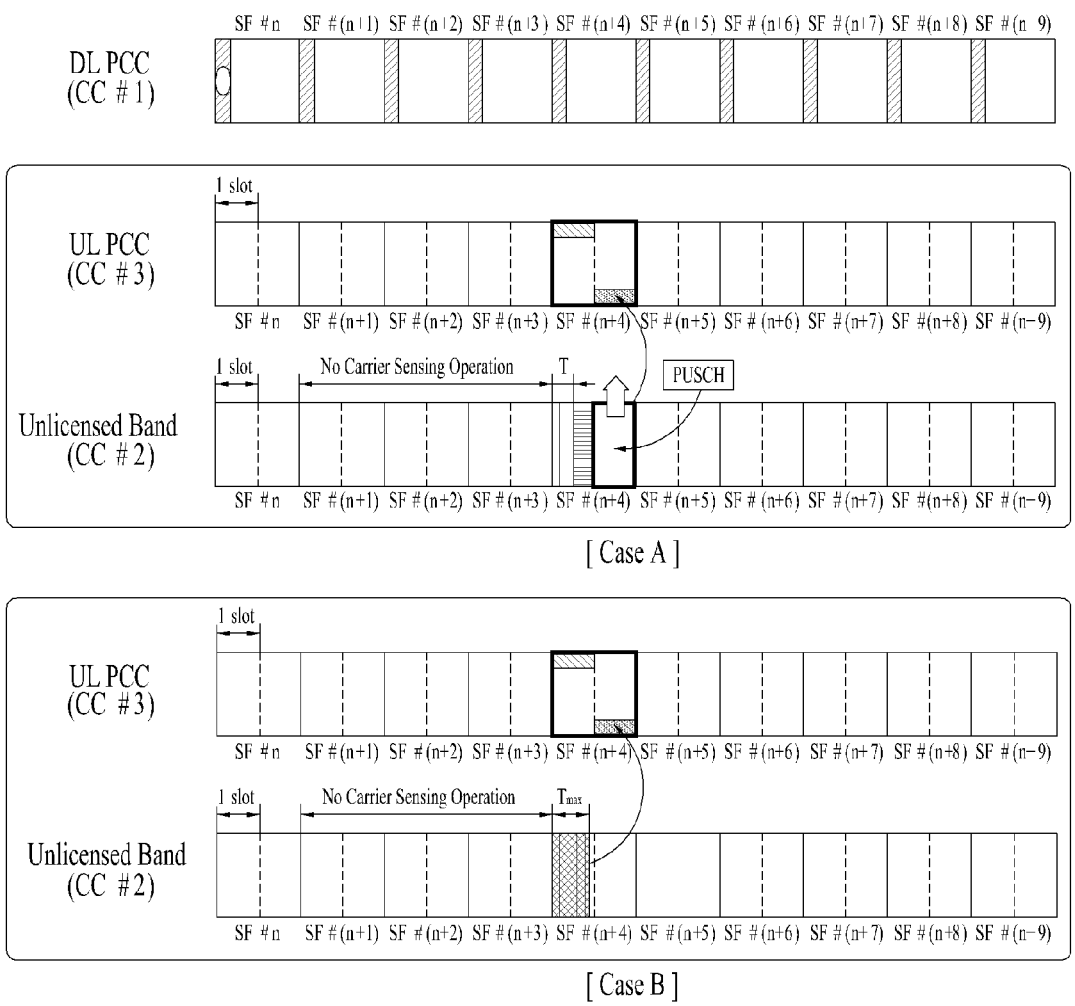
FIG. 35 illustrates an example of transmitting information related to a Secondary Cell (SCell) in uplink resources of a Primary Cell (PCell)

FIG. 35 illustrates a specific exemplary operation according to the first embodiment of the present invention. It is assumed herein that a UE has received a UL grant for a UL subframe of CC #2 in SF #n of CC #1 and starts to perform a CS operation on CC #2 in the first slot of SF #(n+4) (e.g. "k=4"). This case may be regarded as a kind of the afore-described Case 1.

In [Case A] of FIG. 35, the UE determines as a result of the CS operation of CC #2, starting from the first slot of SF #(n+4) that CC #2 is idle for a time period T. Thus the UE transmits a CRTB for a time period from [the start of the first slot of SF #(n+4)+T] to [the end of the first slot of SF #(n+4)] and transmits a PUSCH for a time period from [the start of the second slot of SF #(n+4)] to [the end of the second slot of SF #(n+4)].

The UE transmits to the eNB 1-bit information about the starting time of the PUSCH transmission (e.g. L_information) (e.g. '1' indicating the start of the (actual) PUSCH transmission at [the start of the second slot of SF #(n+4)) in PUCCH resources (the second slot) of CC #3 (e.g. a UL PCC) at the starting time of the actual PUSCH transmission (e.g. in the second slot of SF #(n+4)).

According to the preset method of Case 3, the ending time of the PUSCH transmission may be [the end of the second slot of SF #(n+4)].

In [Case B] of FIG. 35, the UE determines as a result of the CS operation of CC #2 starting from the first slot of SF #(n+4) that CC #2 is busy for a preset time period $T_{max}$ and thus does not transmit a PUSCH in the second slot of SF #(n+4).

The UE may transmit to the eNB 1-bit information about this situation (e.g. '0' indicating no PUSCH transmission in SF #(n+4)) in PUCCH resources of the second slot of SF #(n+4) in CC #3 (e.g. the UL PCC).

While the above description focuses on using a PUCCH of a PCell matching the transmission timing of a PUSCH in an SCell for the convenience of description, the present invention is not limited thereto. Thus, a time point before or after the transmission timing of the PUSCH in the SCell, or a preset specific time point may be used in the present invention.

Embodiment 4

Figure 36:
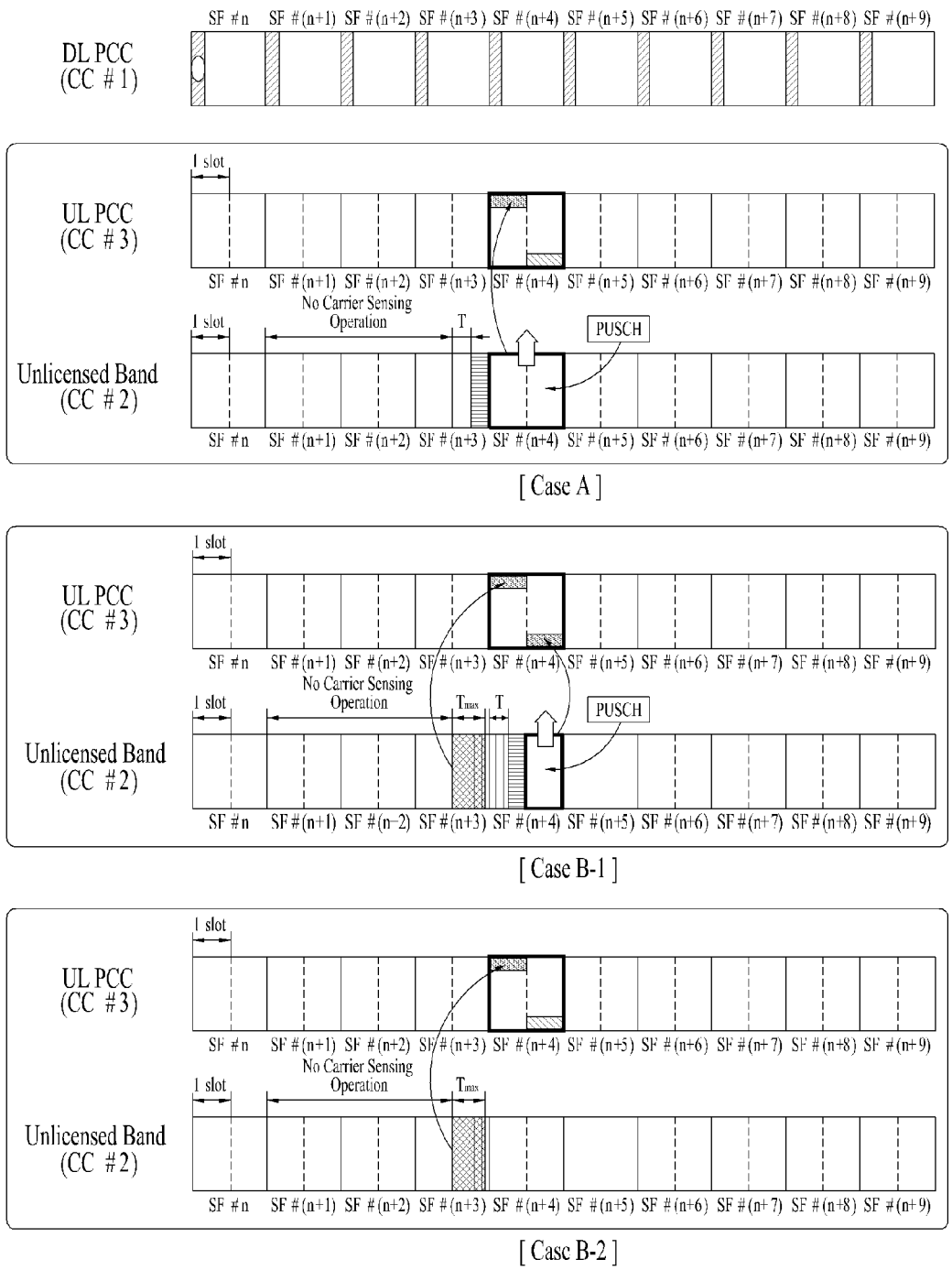
FIG. 36 illustrates another example of transmitting information related to an SCell in uplink resources of a PCell.

FIG. 36 illustrates a specific exemplary operation according to the first embodiment of the present invention.

A UE has received a UL grant for a UL subframe of CC #2 in SF #n of CC #1 and starts to perform a CS operation on CC #2 in the second slot of SF #(n+3) (e.g. "k=3"). This case may be regarded as a kind of the afore-described Case 1.

In [Case A] of FIG. 36, the UE determines as a result of the CS operation of CC #2, starting from the second slot of SF #(n+3) that CC #2 is idle for a time period T. Thus the UE transmits a CRTB for a time period from [the start of the second slot of SF #(n+3)+T] to [the end of the second slot of SF #(n+3)] and transmits a PUSCH for a time period from [the start of the first slot of SF #(n+4)] to [the end of the second slot of SF #(n+4)].

The UE transmits to the eNB 1-bit information about the starting time of the PUSCH transmission (e.g. L_information) (e.g. '1' indicating the start of the (actual) PUSCH transmission at [the start of the first slot of SF #(n+4)]) in PUCCH resources (the first slot) of CC #3 (e.g. a UL PCC) at the starting time of the actual PUSCH transmission (e.g. in the first slot of SF #(n+4)).

The ending time of the PUSCH transmission is [the end of the second slot of SF #(n+4)] according to the preset method of Case 3.

In [Case B-1] of FIG. 36, the UE determines as a result of the CS operation of CC #2 starting from the second slot of SF #(n+3) that CC #2 is busy for a preset time period $T_{max}$ and thus discontinues the CS operation in the corresponding slot. Then the UE resumes the CS operation, starting from the first slot of SF #(n+4).

The UE determines as a result of the CS operation of CC #2, starting from the first slot of SF #(n+4) that CC #2 is idle for a time period T. Then the UE transmits a CRTB for a time period from [the start of the first slot of SF #(n+4)+T] to [the end of the first slot of SF #(n+4)] and transmits a PUSCH for a time period from [the start of the second slot of SF #(n+4)] to [the end of the second slot of SF #(n+4)].

The UE transmits to the eNB 1-bit information set to '0' indicating no PUSCH transmission in the first slot of SF #(n+4) in PUCCH resources of the first slot of SF #(n+4) in CC #3 (e.g. the UL PCC) and 1-bit information set to '1' indicating the start of the PUSCH transmission in [the start of the second slot of SF #(n+4)] in PUCCH resources of the second slot of SF #(n+4) in CC #3 (e.g. the UL PCC).

The ending time of the PUSCH transmission is [the end of the second slot of SF #(n+4)] according to the preset method of Case 3.

In [Case B-2] of FIG. 36, the UE determines as a result of the CS operation of CC #2 starting from the second slot of SF #(n+3) that CC #2 is busy for the preset time period $T_{max}$ and thus does not transmit a PUSCH in SF #(n+4).

The UE may transmit to the eNB 1-bit information about this situation (e.g. '0' indicating no PUSCH transmission in SF #(n+4)) in PUCCH resources of the first slot of SF #(n+4) in CC #3 (e.g. the UL PCC).

While the above description focuses on using a PUCCH of a PCell matching the transmission timing of a PUSCH in an SCell for the convenience of description, the present invention is not limited thereto. Thus, a time point before or after the transmission timing of the PUSCH in the SCell, or a preset specific time point may be used in the present invention.

Embodiment 5

Figure 37:
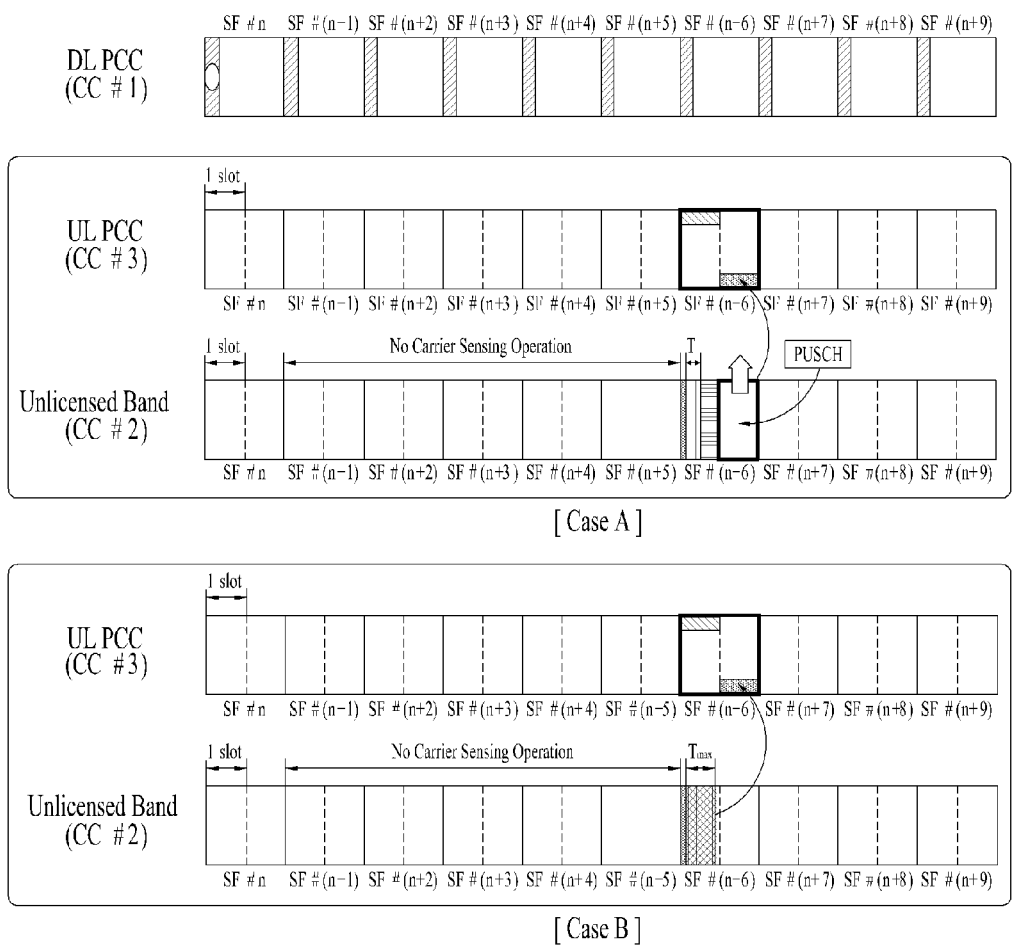
FIG. 37 illustrates another example of transmitting information related to an SCell in uplink resources of a PCell.

FIG. 37 illustrates a specific exemplary operation according to the first embodiment of the present invention.

A UE receives "a UL grant for a UL subframe of CC #2 in SF #n of CC #1" and receives "an activation message that activates the UL grant received in SF #n of CC #1" in SF #(n+6) of CC #1".

The UE starts to perform a CS operation on CC #2 in the first slot of SF #(n+6). This case may be regarded as a kind of the afore-described Case 2.

In [Case A] of FIG. 37, the UE receives and decodes the activation message in SF #(n+6) and determines as a result of the CS operation of CC #2 that CC #2 is idle for a time period T. Thus the UE transmits a CRTB for a time period from [the start of the first slot of SF #(n+6)+the time taken to receive and decode the activation message+T] to [the end of the first slot of SF #(n+6)] and transmits a PUSCH for a time period from [the start of the second slot of SF #(n+6)] to [the end of the second slot of SF #(n+6)].

The UE transmits to the eNB 1-bit information about the starting time of the PUSCH transmission (e.g. L_information) (e.g. '1' indicating the start of the (actual) PUSCH transmission at [the start of the second slot of SF #(n+6)]) in PUCCH resources (the second slot) of CC #3 (e.g. the UL PCC) at the starting time of the actual PUSCH transmission (e.g. in the second slot of SF #(n+6)).

The ending time of the PUSCH transmission is [the end of the second slot of SF #(n+6)] according to the preset method of Case 3.

In [Case B] of FIG. 37, the UE receives the activation message in SF #(n+6), decodes the activation message, and determines as a result of the CS operation of CC #2 that CC #2 is busy for a preset time period $T_{max}$. Thus the UE does not transmit a PUSCH in (the second slot of) SF #(n+6).

The UE may transmit to the eNB 1-bit information about this situation (e.g. '0' indicating no PUSCH transmission in (the second slot of) SF #(n+6)) in PUCCH resources of the second slot (of SF #(n+6)) in CC #3 (e.g. the UL PCC).

While the above description focuses on using a PUCCH of a PCell matching the transmission timing of a PUSCH in an SCell for the convenience of description, the present invention is not limited thereto. Thus, a time point before or after the transmission timing of the PUSCH in the SCell, or a preset specific time point may be used in the present invention.

Embodiment 6

Figure 38:
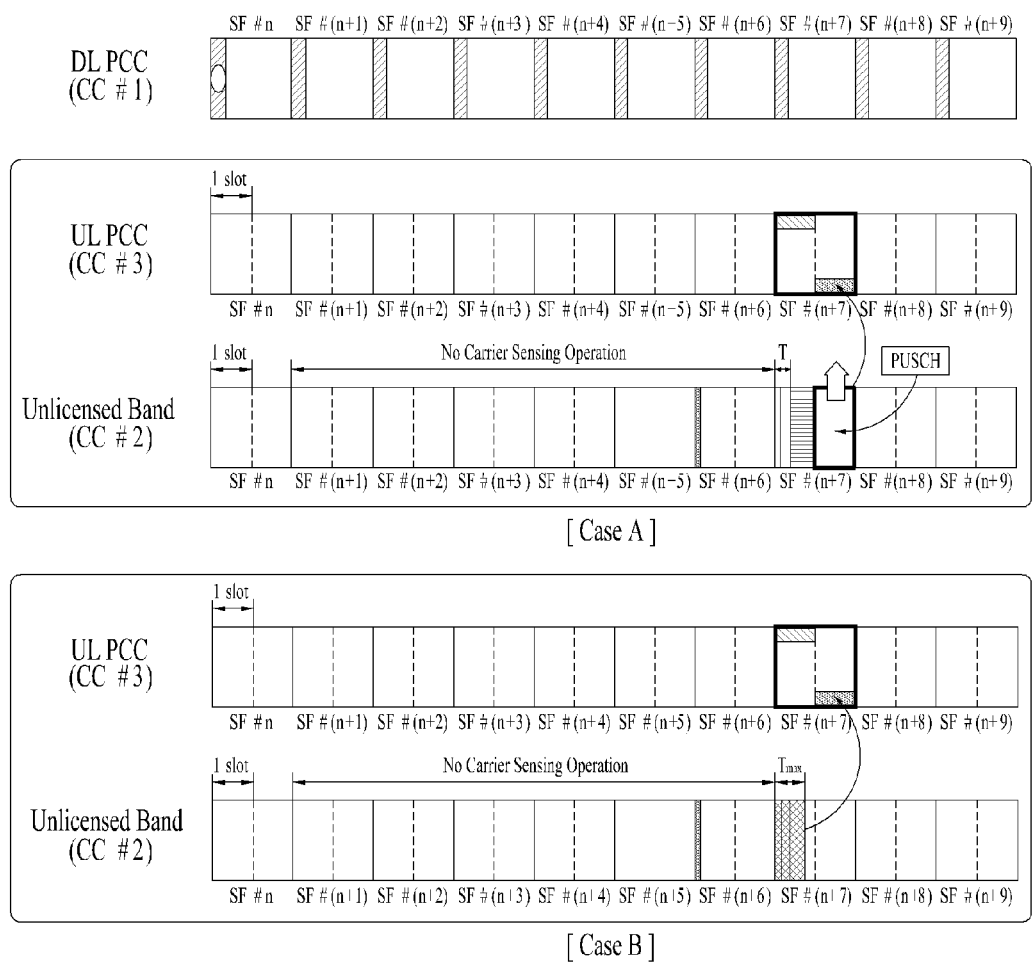
FIG. 38 illustrates another example of transmitting information related to an SCell in uplink resources of a PCell.

FIG. 38 illustrates a specific exemplary operation according to the first embodiment of the present invention.

A UE may receive "a UL grant for a UL subframe of CC #2 in SF #n of CC #1" and may receive "an activation message that activates the UL grant received in SF #n of CC #1" in SF #(n+6) of CC #1".

In FIG. 38, the UE starts to perform a CS operation the first slot of SG #(h+i) (e.g. "i=1") (e.g. the first slot of SF #(n+7)) other than SF #h (e.g. SF #(n+6)) in which the activation message has been received. This case may be regarded as a kind of the afore-described Case 2.

In [Case A] of FIG. 38, the UE receives and decodes the activation message in SF #(n+6) and determines as a result of the CS operation of CC #2 in the first slot of SF #(n+7) that CC #2 is idle for a time period T. Thus the UE transmits a CRTB for a time period from [the start of the first slot of SF #(n+7)+T] to [the end of the first slot of SF #(n+7)] and transmits a PUSCH for a time period from [the start of the second slot of SF #(n+7)] to [the end of the second slot of SF #(n+7)].

The UE transmits to the eNB 1-bit information about the starting time of the PUSCH transmission (e.g. L_information) (e.g. '1' indicating the start of the (actual) PUSCH transmission at [the start of the second slot of SF #(n+7)]) in PUCCH resources (the second slot) of CC #3 (e.g. a UL PCC) at the starting time of the actual PUSCH transmission (e.g. in the second slot of SF #(n+7)).

The ending time of the PUSCH transmission is [the end of the second slot of SF #(n+7)] according to the preset method of Case 3.

In [Case B] of FIG. 38, the UE receives the activation message in SF #(n+6), decodes the activation message, and determines as a result of the CS operation of CC #2 in the first slot of SF #(n+7) that CC #2 is busy for the preset time period $T_{max}$. Thus the UE does not transmit a PUSCH in (the second slot of) SF #(n+7).

The UE may transmit to the eNB 1-bit information about this situation (e.g. '0' indicating no PUSCH transmission in (the second slot of) SF #(n+7)) in PUCCH resources of the second slot (of SF #(n+7)) in CC #3 (e.g. the UL PCC).

While the above description focuses on using a PUCCH of a PCell matching the transmission timing of a PUSCH in an SCell for the convenience of description, the present invention is not limited thereto. Thus, a time point before or after the transmission timing of the PUSCH in the SCell, or a preset specific time point may be used in the present invention.

Embodiment 7

Figure 39:
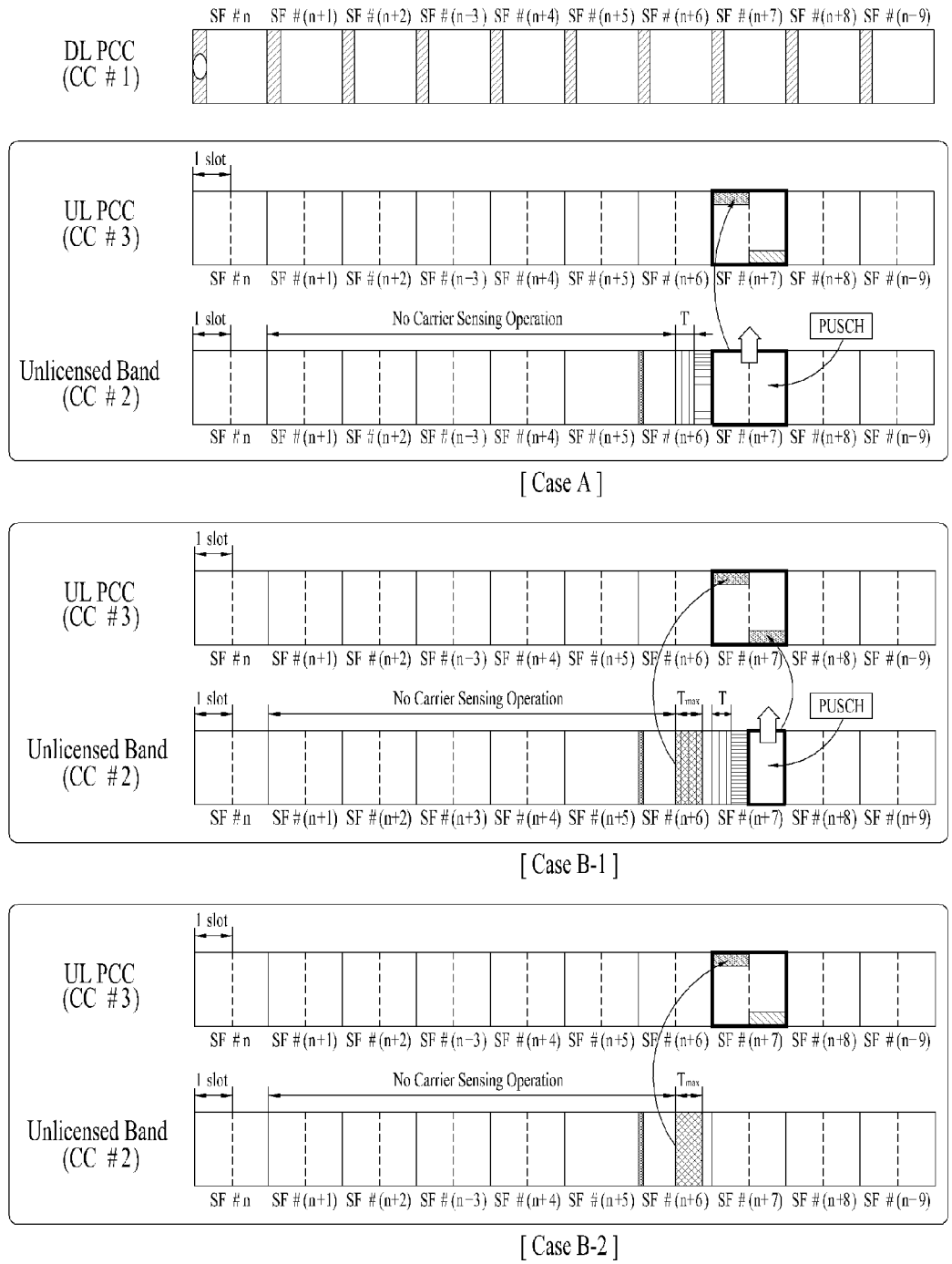
FIG. 39 illustrates another example of transmitting information related to an SCell in uplink resources of a PCell.

FIG. 39 illustrates a specific exemplary operation according to the first embodiment of the present invention.

A UE may receive "a UL grant for a UL subframe of CC #2 in SF #n of CC #1" and may receive "an activation message that activates the UL grant received in SF #n of CC #1" in SF #(n+6) of CC #1".

The UE may start to perform a CS operation on CC #2 in the second slot of SG #(n+6). This case may be regarded as a kind of the afore-described Case 2.

In [Case A] of FIG. 39, the UE determines as a result of the CS operation of CC #2, starting from the second slot of SF #(n+6) that CC #2 is idle for a time period T. Thus the UE transmits a CRTB for a time period from [the start of the second slot of SF #(n+6)+T] to [the end of the second slot of SF #(n+6)] and transmits a PUSCH for a time period from [the start of the first slot of SF #(n+7)] to [the end of the second slot of SF #(n+7)].

The UE transmits to the eNB 1-bit information about the starting time of the PUSCH transmission (e.g. L_information) (e.g. '1' indicating the start of the (actual) PUSCH transmission at [the start of the first slot of SF #(n+7)]) in PUCCH resources (the first slot) of CC #3 (e.g. a UL PCC) at the starting time of the actual PUSCH transmission (e.g. in the first slot of SF #(n+7)).

The ending time of the PUSCH transmission is [the end of the second slot of SF #(n+7)] according to the preset method of Case 3.

In [Case B-1] of FIG. 39, the UE determines as a result of the CS operation of CC #2, starting from the second slot of SF #(n+6) that CC #2 is busy for the preset time period $T_{max}$. Thus the UE discontinues the CS operation and then resumes the CS operation, starting from the first slot of SF #(n+7).

Determining as a result of the CS operation of CC #2 starting from the first slot of SF #(n+7) that CC #2 is idle for the time period T, the UE transmits a CRTB for a time period from [the start of the first slot of SF #(n+7)+T] to [the end of the first slot of SF #(n+7)] and transmits a PUSCH for a time period from [the start of the second slot of SF #(n+7)] to [the end of the second slot of SF #(n+7)].

The UE transmits to the eNB 1-bit information set to '0' indicating no PUSCH transmission in the first slot of SF #(n+7) in PUCCH resources of the first slot of SF #(n+7) in CC #3 (e.g. the UL PCC) and 1-bit information set to '1' indicating the start of the PUSCH transmission in [the second slot of SF #(n+7)] in PUCCH resources of the second slot of SF #(n+7) in CC #3 (e.g. the UL PCC).

The ending time of the PUSCH transmission is [the end of the second slot of SF #(n+7)] according to the preset method of Case 3.

In [Case B-2] of FIG. 39, the UE determines as a result of the CS operation of CC #2, starting from the second slot of SF #(n+6) that CC #2 is busy for the preset time period $T_{max}$. Thus the UE does not transmit a PUSCH in SF #(n+7).

The UE may transmit to the eNB 1-bit information indicating this situation (e.g. '0' indicating no PUSCH transmission in SF #(n+7)) in PUCCH resources of the first slot (of SF #(n+7)) in CC #3 (e.g. the UL PCC).

While the above description focuses on using a PUCCH of a PCell matching the transmission timing of a PUSCH in an SCell for the convenience of description, the present invention is not limited thereto. Thus, a time point before or after the transmission timing of the PUSCH in the SCell, or a preset specific time point may be used in the present invention.

Embodiment 8

Figure 40:
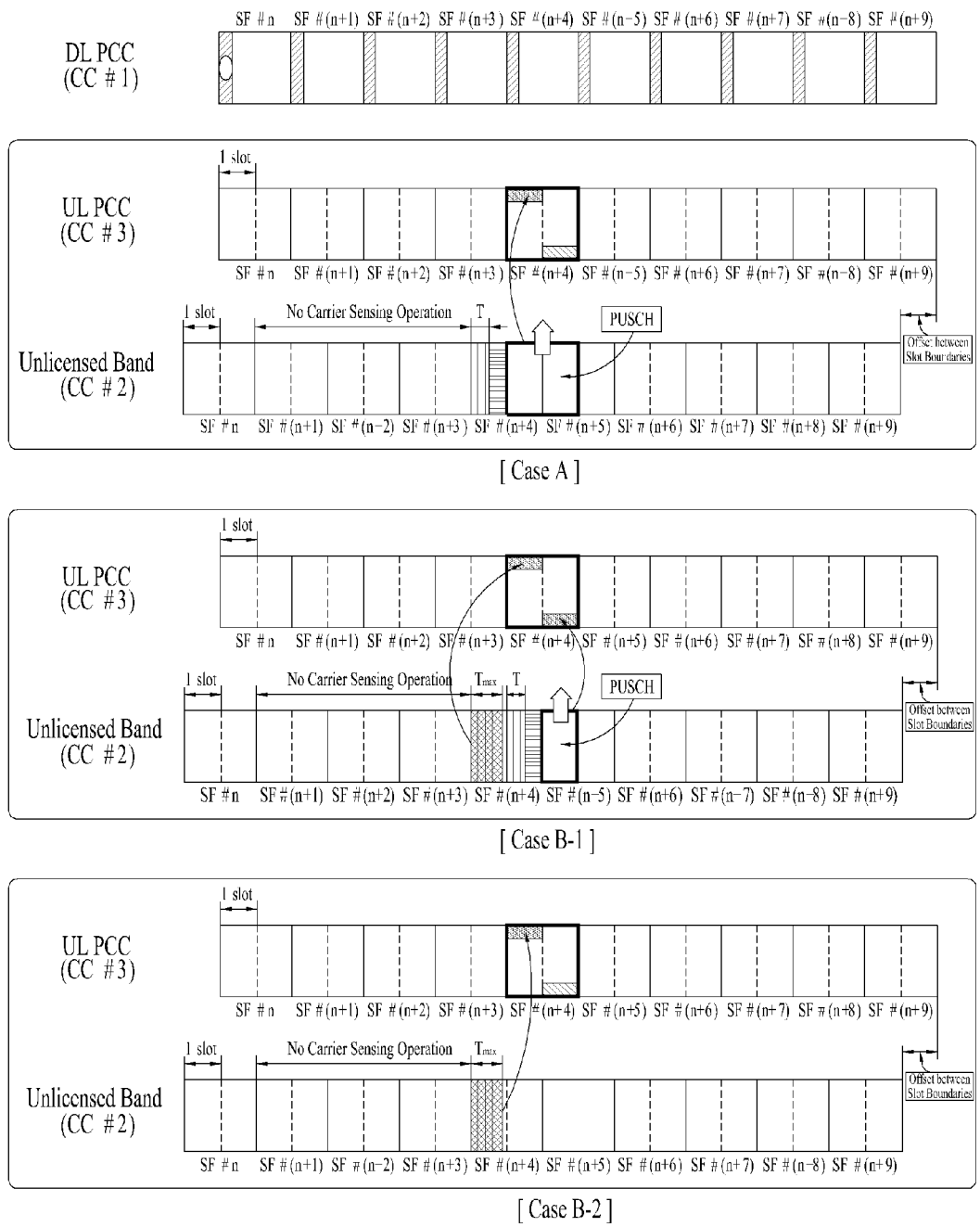
FIG. 40 illustrates an example of transmitting information related to an SCell in uplink resources of a PCell, in the case where a slot offset is set between the PCell and the SCell.

FIG. 40 illustrates a specific exemplary operation according to the first embodiment of the present invention.

In FIG. 40, a "slot offset W" is applied between a PCell (e.g. CC #1 (DL PCell) or CC #3 (UL PCell)) and an SCell (e.g. CC #2).

An eNB may indicate a value of W to a UE in advance by a higher-layer signal or a physical-layer signal.

In FIG. 40, it is assumed that "W=1", the UE receives a UL grant for a UL subframe of CC #2 in SF #n of CC #1 and starts to perform a CS operation on CC #2 in the first slot of SF #(n+4) of CC #2 from the viewpoint of SF indexing of CC #2. Case 1 is applied to FIG. 40.

In [Case A] of FIG. 40, the UE determines as a result of the CS operation of CC #2, starting from the first slot of SF #(n+4) from the viewpoint of SF indexing of CC #2 that CC #2 is idle for a time period T. Thus the UE transmits a CRTB for a time period from [the start of the first slot of SF #(n+4)+T] to [the end of the first slot of SF #(n+4)] and transmits a PUSCH for a time period from [the start of the second slot of SF #(n+4)] to [the end of the first slot of SF #(n+5)].

The UE transmits to the eNB 1-bit information about the starting time of the PUSCH transmission (e.g. L_information) (e.g. '1' indicating the start of the (actual) PUSCH transmission at [the start of the first slot of SF #(n+4) from the viewpoint of SF indexing of CC #3]) in PUCCH resources (the first slot) of CC #3 (e.g. a UL PCC) at the starting time of the actual PUSCH transmission (e.g. in the first slot of SF #(n+4) from the viewpoint of SF indexing of CC #3).

The ending time of the PUSCH transmission is [the end of the second slot of SF #(n+4)] from the viewpoint of SF indexing of CC #3 according to the preset method of Case 3.

In [Case B-1] of FIG. 40, the UE determines as a result of the CS operation of CC #2, starting from the first slot of SF #(n+4) from the viewpoint of SF indexing of CC #2 that CC #2 is busy for the preset time period $T_{max}$. Thus the UE discontinues the CS operation in the corresponding slot and then resumes the CS operation, starting from the second slot of SF #(n+4).

Determining as a result of the CS operation of CC #2 starting from the second slot of SF #(n+4) from the viewpoint of SF indexing of CC #2 that CC #2 is idle for the time period T, the UE transmits a CRTB for a time period from [the start of the second slot of SF #(n+4)+T] to [the end of the second slot of SF #(n+4)] and transmits a PUSCH for a time period from [the start of the first slot of SF #(n+5)] to [the end of the first slot of SF #(n+5)].

The UE transmits to the eNB 1-bit information set to '0' indicating no PUSCH transmission in the first slot of SF #(n+4) in PUCCH resources of the first slot (of SF #(n+4)) in CC #3 (e.g. the UL PCC) from the viewpoint of SF indexing of CC #3 and 1-bit information set to '1' indicating the start of the PUSCH transmission at [the start of the second slot of SF #(n+4) from the viewpoint of SF indexing of CC #3] in PUCCH resources of the second slot (of SF #(n+4)) in CC #3 (e.g. the UL PCC).

The ending time of the PUSCH transmission is [the end of the second slot of SF #(n+4) from the viewpoint of SF indexing of CC #3] according to the preset method of Case 3.

In [Case B-2] of FIG. 40, the UE determines as a result of the CS operation of CC #2, starting from the first slot of SF #(n+4) that CC #2 is busy for the preset time period $T_{max}$. Thus the UE does not transmit a PUSCH in SF #(n+4) from the viewpoint of SF indexing of CC #3.

The UE transmits to the eNB 1-bit information indicating this situation (e.g. '0' indicating no PUSCH transmission in SF #(n+4) from the viewpoint of SF indexing of CC #3) in PUCCH resources of the first slot (of SF #(n+4)) in CC #3 (e.g. the UL PCC) from the viewpoint of SF indexing of CC #3.

In [Case A] of FIG. 40, since a "slot offset W" is applied between a PCell (e.g. CC #1 (DL PCell) or CC #3 (UL PCell)) and an SCell (e.g. CC #2), the UE may use one whole subframe for PUSCH transmission after a CS operation.

Embodiment 1 to Embodiment 8 may be modified and extended in such a manner that a UE transmits a PUSCH immediately when determining CC #2 is idle for a time period T by a CS operation of CC #2, without transmitting a CRTB.

In another method, the UE may not transmit information about "whether a PUSCH is to be transmitted in an SCell" and information about "the starting/ending time of PUSCH transmission" to the eNB in UL resources of a PCell ensuring a transmission opportunity all the time (or at a preset time point). Rather, the UE may use a "known preamble (sequence)" configured to serve this purpose (e.g. to indicate "whether a PUSCH is to be transmitted in an SCell" and "the starting/ending time of PUSCH transmission"), preset between the eNB and the UE.

While the above description focuses on using a PUCCH of a PCell matching the transmission timing of a PUSCH in an SCell for the convenience of description, the present invention is not limited thereto. Thus, a time point before or after the transmission timing of the PUSCH of the SCell, or a preset specific time point may be used in the present invention.

The foregoing proposed methods may be extended to a CA situation in which two or more CCs are aggregated in an FDD or TDD system.

The present invention may be extended to a case where specific radio resources (e.g. time/frequency resources) for which a usage is not set are independently used as well as a case where the specific radio resources are aggregated.

In addition, the present invention may be extended to a case where a (preset) usage of specific resources of each CC used for communication between a transmitter and a receiver is (dynamically) changed according to a system load state in a CA environment.

The present invention may be extended to any case of PDCCH-based or Enhanced-PDCCH (E-PDCCH)-based communication.

The present invention may be extended to a case where an extension carrier is additionally aggregated for communication.

The proposed methods may be extended to a case where Device-to-Device (D2D) communication is conducted in a specific frequency band allocated for such a communication usage or existing (cell-specific) radio resources are (re)used by changing the usage of the existing radio resources in a D2D communication environment.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an access point, etc. The term terminal may be replaced with a UE, a Mobile Station (MS), a Mobile Subscriber Station (MSS), etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for transmitting control information in a wireless communication system have been described in the context of a 3GPP LTE system, by way of example, they are applicable to many other wireless communication systems.

The invention claimed is:

1. A method for transmitting information to a Base Station (BS) at a User Equipment (UE) in a wireless communication system, the method comprising:
   receiving first information for cross carrier scheduling from the BS in a downlink primary cell among at least one serving cell configured for the UE, wherein the first information indicates an uplink transmission of the UE in an uplink secondary cell among the at least one serving cell; and
   transmitting second information about the uplink secondary cell among the at least one serving cell to the BS in an uplink primary cell.

2. The method according to claim 1, wherein the second information includes at least one of information indicating whether a Physical Uplink Shared CHannel (PUSCH) is transmitted in the uplink secondary cell, information about a starting time of the PUSCH transmission in the uplink secondary cell, and information about an ending time of the PUSCH transmission in the uplink secondary cell.

3. The method according to claim 2, wherein the ending time of the PUSCH transmission in the uplink secondary cell is after a predetermined period for the PUSCH transmission from the starting time of the PUSCH transmission in the uplink secondary cell.

4. The method according to claim 2, wherein the ending time of the PUSCH transmission in the uplink secondary cell is a subframe boundary or a slot boundary of the uplink primary cell, closest to the starting time of the PUSCH transmission in the uplink secondary cell.

5. The method according to claim 1, wherein the uplink primary cell includes a Physical Uplink Control CHannel (PUCCH) and a Physical Uplink Shared CHannel (PUSCH).

6. The method according to claim 1, wherein the second information is one bit, and
   wherein if the second information indicates 0, the second information indicates no Physical Uplink Shared CHannel (PUSCH) transmission in the uplink secondary cell and if the second information indicates 1, the second information indicates that the PUSCH transmission is scheduled in the uplink secondary cell, starting from the starting time of a corresponding slot.

7. The method according to claim 1, wherein the second information is two bits, and
   wherein the second information indicates whether a Physical Uplink Shared CHannel (PUSCH) transmission is scheduled in the uplink secondary cell, a starting time of the PUSCH transmission in the uplink secondary cell, and an ending time of the PUSCH transmission in the uplink secondary cell, respectively specified by a combination of the two bits.

8. The method according to claim 1, further comprising transmitting state information about the uplink secondary cell to the BS,
   wherein the state information includes the second information.

9. The method according to claim 8, wherein the state information indicates that a result of carrier sensing of the uplink secondary cell is kept busy for a predetermined time or longer.

10. The method according to claim 1, wherein the uplink secondary cell is on unlicensed bands.

11. The method according to claim 1, further comprising:
    performing carrier sensing to detect the uplink secondary cell.

12. A User Equipment (UE) for transmitting information to a Base Station (BS) in a wireless communication system, the UE comprising:
    a processor;
    a reception module configured to receive first information for cross carrier scheduling from the BS in a downlink primary cell among at least one serving cell configured for the UE, wherein the first information indicates an uplink transmission of the UE in an uplink secondary cell among the at least one serving cell; and
    a transmission module configured to transmit second information about the uplink secondary cell among the at least one serving cell to the BS in an uplink primary cell.

13. The UE according to claim 12, wherein the second information includes at least one of information indicating whether a Physical Uplink Shared CHannel (PUSCH) is transmitted in the uplink secondary cell, information about a starting time of the PUSCH transmission in the uplink secondary cell, and information about an ending time of the PUSCH transmission in the uplink secondary cell.

14. The UE according to claim 13, wherein the ending time of the PUSCH transmission in the uplink secondary cell is after a predetermined period for the PUSCH transmission from the starting time of the PUSCH transmission in the uplink secondary cell.

15. The UE according to claim 13, wherein the ending time of the PUSCH transmission in the uplink secondary cell is a subframe boundary or a slot boundary of the uplink primary cell, closest to the starting time of the PUSCH transmission in the uplink secondary cell.

16. The UE according to claim 12, wherein the uplink primary cell includes a Physical Uplink Control CHannel (PUCCH) and a Physical Uplink Shared CHannel (PUSCH).

17. The UE according to claim 12, wherein the second information is one bit, and
    wherein if the second information indicates 0, the second information indicates no Physical Uplink Shared CHannel (PUSCH) transmission in the uplink secondary cell and if the second information indicates 1, the second information indicates that the PUSCH transmission is scheduled in the uplink secondary cell, starting from the starting time of a corresponding slot.

18. The UE according to claim 12, wherein the second information is two bits, and
wherein the second information indicates whether a Physical Uplink Shared CHannel (PUSCH) transmission is scheduled in the uplink secondary cell, a starting time of the PUSCH transmission in the uplink secondary cell, and an ending time of the PUSCH transmission in the uplink secondary cell, respectively specified by a combination of the two bits.

19. The UE according to claim 12, wherein the processor is configured to control transmission of state information about the uplink secondary cell to the BS through the transmission module, and
wherein the state information includes the second information.

20. The UE according to claim 19, wherein the state information indicates that a result of carrier sensing of the uplink secondary cell is kept busy for a predetermined time or longer.

21. The UE according to claim 12, wherein the uplink secondary cell is on unlicensed bands.

22. The UE according to claim 12, wherein the processor is further configured to performing carrier sensing to detect the uplink secondary cell.

* * * * *